US012089319B2

(12) United States Patent
Cooper

(10) Patent No.: US 12,089,319 B2
(45) Date of Patent: Sep. 10, 2024

(54) METHOD OF JOINING A LIGHTING DEVICE TO A NETWORK AND PAIRING THE LIGHTING DEVICE WITH A REMOTE CONTROL DEVICE

(71) Applicant: REMOTE CONTROLLED LIGHTING LTD, London (GB)

(72) Inventor: Edward Peter George Cooper, London (GB)

(73) Assignee: Remote Controlled Lighting LTD, London (GB)

( * ) Notice: Subject to any disclaimer, the term of this patent is extended or adjusted under 35 U.S.C. 154(b) by 354 days.

(21) Appl. No.: 17/421,810

(22) PCT Filed: Jan. 10, 2020

(86) PCT No.: PCT/GB2020/050051
§ 371 (c)(1),
(2) Date: Jul. 9, 2021

(87) PCT Pub. No.: WO2020/144481
PCT Pub. Date: Jul. 16, 2020

(65) Prior Publication Data

US 2022/0104333 A1 Mar. 31, 2022

(30) Foreign Application Priority Data

Jan. 11, 2019 (GB) ...................................... 1900442

(51) Int. Cl.
*H05B 47/195* (2020.01)
*G08C 17/02* (2006.01)

(52) U.S. Cl.
CPC ........... *H05B 47/195* (2020.01); *G08C 17/02* (2013.01); *G08C 2201/21* (2013.01); *G08C 2201/71* (2013.01)

(58) Field of Classification Search
CPC .... H05B 47/195; H05B 47/19; H05B 47/199; G08C 2201/71; G08C 17/02; G08C 2201/21
See application file for complete search history.

(56) References Cited

U.S. PATENT DOCUMENTS 10,383,200 B1 * 8/2019 Romano ............ H04L 12/2807
11,700,678 B2 * 7/2023 Bowser ................. H05B 47/19
315/291

(Continued)

FOREIGN PATENT DOCUMENTS

EP 1994800 B1 * 7/2013 ............ H05B 37/02
EP 3871375 A1 9/2021
WO WO-2020131549 A1 * 6/2020 ......... H04L 12/2807

OTHER PUBLICATIONS

M. F. Akorede, "Efficient Remote Control System using SMS and WiFi Technology for Outdoor Security Lighting Applications," Jul. 27, 2017,2017 IEEE PES PowerAfrica, pp. 512-516.*

(Continued)

*Primary Examiner* — Omar S Ismail
(74) *Attorney, Agent, or Firm* — Haynes and Boone, LLP

(57) ABSTRACT

A method of joining a lighting device (3') to a network (2) and pairing the lighting device with a remote control device (7), the method comprising: transmitting a joining code to one or more lighting devices (3') using an electromagnetic radiation signal (31); selecting a lighting device (3') to be joined to a network (2) and paired with a remote control device (7) by directing a directional beam of electromagnetic radiation (30) onto a sensor (2) of a lighting device (3'); in response to receipt of the directional beam of electromagnetic radiation and of the joining code from the electromagnetic radiation signal, by the selected device, joining the selected device to the network if the received joining code is an access code for the network and pairing the joined (Continued)

device (3) with a remote control device (7) such that the joined device is controllable, on the network, by the remote control device (7).

19 Claims, 15 Drawing Sheets

(56) References Cited

U.S. PATENT DOCUMENTS

| | | | | |
|---|---|---|---|---|
| 2003/0151909 | A1* | 8/2003 | Sid | H05B 47/20<br>362/85 |
| 2005/0243549 | A1* | 11/2005 | Ruston | F21V 21/30<br>362/418 |
| 2013/0051806 | A1* | 2/2013 | Quilici | H05B 47/195<br>398/106 |
| 2013/0147366 | A1* | 6/2013 | Huizenga | H05B 47/10<br>315/152 |
| 2016/0302288 | A1* | 10/2016 | Gotoh | H05B 45/10 |
| 2016/0302289 | A1* | 10/2016 | Nishioka | G08C 17/02 |
| 2016/0381769 | A1* | 12/2016 | Murakami | G08C 17/02<br>315/307 |
| 2017/0150581 | A1* | 5/2017 | Wagoner | H05B 47/199 |
| 2019/0141291 | A1* | 5/2019 | McNelley | H04N 9/3185 |

OTHER PUBLICATIONS

Jyoti Rani, “Li-Fi (Light Fidelity)—The future technology In Wireless communications,” 2012, International Journal of Applied Engineering Research, vol. 7 No. 11 (2012), pp. 1-3.*

First Examination Report issued for GB Application No. 1900442.3 dated Dec. 6, 2021, 6 pages.

International Search Report for PCT/GB2020/050051 mailed Jun. 25, 2020, 4 pages.

* cited by examiner

METHOD OF JOINING A LIGHTING DEVICE TO A NETWORK AND PAIRING THE LIGHTING DEVICE WITH A REMOTE CONTROL DEVICE

CROSS REFERENCE TO RELATED APPLICATION

This application is a 35 U.S.C. 371 National Phase Entry Application from PCT/GB2020/050051, filed Jan. 10, 2020, which claims priority to United Kingdom Patent Application No. 1900442.3, filed Jan. 11, 2019, the disclosures of which are incorporated herein in their entirety by reference, and priority is claimed to each of the foregoing.

FIELD OF THE INVENTION

The present invention relates to a method of joining a lighting device to a network and pairing the lighting device with a remote control device such that the lighting device is controllable, on the network, by the remote control device. In particular, but not exclusively, the network is a wireless network.

The present invention also relates to a lighting system, for lighting a space.

The present invention also relates to a lighting device for being joined to a network and paired with a remote control device such that the joined device is controllable, on the network, by the remote control device.

The present invention also relates to a remote selection device for use in the method, a kit of parts, a computer program product and a network controller for use in the method.

BACKGROUND OF THE INVENTION

A known lighting system comprises a plurality of lighting devices, on a network, that are paired with a remote control device such that they controllable by the remote control device. In order to pair a lighting device, that is being added to the network, with the remote control device, it is necessary for the remote control device to identify the lighting device so that it can assign specific control commands to the lighting device. This can be a slow and time consuming process, that has a relatively high risk of user error.

Furthermore pairing lighting devices that are hard to reach, or out of reach, (e.g. ceiling mounted), with a remote control device, presents difficulties due to their inaccessibility.

In addition, a lighting system is typically installed by electrical contractors and commissioned by technicians with only limited experience of and training in networks (in particular wireless networks), so if the setup of the lighting system is complex this can be time consuming and result in installation errors. When lighting devices are added to a network the installer can be required to read a unique code (typically 6 alphanumeric digits) on each lighting device and enter it into a smartphone application. In this respect, the installer has to be close to each lighting device to read the code which can be impractical, for example where there are a large number of lighting devices to be installed and in particular where the lighting devices are to be installed in hard to reach places, such as on a ceiling. The lighting devices will typically not previously have been joined to any network because typically the network will not exist at the time of installation.

Even if the network does exist, any plan or diagram relating the position of each lighting device to its code is likely to be inaccurate, incomplete or unavailable. Access to each lighting device in order to read the codes will be expensive in terms of time and equipment and it may be hazardous.

In another known method of installation of a lighting system it is necessary to enter all the codes (for the lighting devices) into a network controller and then cause each light to flash in turn to enable it to be identified. This is cumbersome, time consuming and prone to error because an accurate list of all installed codes must be available.

The present invention seeks to address or mitigate at least some of the above mentioned problems. Alternatively, or additionally, the present invention seeks to provide an improved method of joining a lighting device to a network and pairing the lighting device with a remote control device such that the lighting device is controllable, on the network, by the remote control device.

Alternatively, or additionally, the present invention seeks to provide an improved lighting system, for lighting a space.

Alternatively, or additionally, the present invention seeks to provide an improved lighting device for being joined to a network and paired with a remote control device such that the joined device is controllable, on the network, by the remote control device.

Alternatively, or additionally, the present invention seeks to provide an improved remote selection device, for use in the method.

Alternatively, or additionally, the present invention seeks to provide an improved kit of parts, for use in the method.

Alternatively, or additionally, the present invention seeks to provide an improved computer program product, for use in the method.

Alternatively, or additionally, the present invention seeks to provide an improved network controller, for use in the method.

SUMMARY OF THE INVENTION

According to a first aspect of the invention there is provided a method of joining a lighting device to a network and pairing the lighting device with a remote control device, the method comprising:

a) transmitting a joining code to one or more lighting devices using an electromagnetic radiation signal;
b) selecting a lighting device to be joined to a network and paired with a remote control device by directing a beam of electromagnetic radiation onto a sensor of a lighting device;
c) in response to receipt of the beam of electromagnetic radiation and of the joining code from the electromagnetic radiation signal, by the selected device, joining the selected device to the network if the received joining code is an access code for the network; and
d) pairing the joined device with a remote control device such that the joined device is controllable, on the network, by the remote control device.

The method may allow for each individual lighting device to be joined to a network and paired with a remote control device, in a relatively quick and simple way that reduces the risk of incorrect installation and may avoid difficult and dangerous work at height. In this respect, it may allow multiple lighting units to be joined to a network, and paired with a remote control device, in a relatively short amount of time and with a relatively low risk of error.

It may also allow for lighting devices that are inaccessible (e.g. due to being located high up, out of reach) to be joined quickly, safely and easily, to a network and paired with a remote control device, where this would otherwise be difficult, dangerous or impossible. In this respect, a user may select each lighting device, and join it to the network and pair it, whilst remaining on the floor level of the room in which the lighting devices are mounted (e.g. in the ceiling). Therefore this may avoid dangerous work at height.

Furthermore because the joining code is transmitted to the selected lighting device, it may not be necessary for each lighting device to be associated with a unique passphrase and for the passphrases for all of the lighting devices to be known and recorded prior to the joining and pairing of the lighting devices.

Also, the selection of an individual lighting device (using the directional electromagnetic beam) and the transmittal of the joining code to the selected lighting device may provide a relatively fast and efficient method of pairing the lighting devices with the remote control device.

In embodiments of the invention the beam of electromagnetic radiation is a directional beam of electromagnetic radiation.

In embodiments of the invention the method of joining a lighting device to a network is such that the lighting device becomes part of the network, i.e. it is added to the network.

In embodiments of the invention the remote control device is connected to the network. The remote control device may have a transmitter and receiver, configured to transmit and receive a wireless signal, via which the remote control device is connected to the network. In this respect, the remote control device may be wirelessly connected to one or more intermediary devices (e.g. a Wi-Fi router) that connect the remote control device to the network.

The remote control device may be user-operated. The remote control device may be portable. In this respect, the remote control device may be movable to different locations. The remote control device may be handheld. In this respect, the remote control device may be of a size and weight that allow it to be handheld. The remote control device may be a phone, for example a smart phone, a smart tablet, a laptop or desktop computer, for example.

In embodiments of the invention, in step (a) the joining code is an access code for the network. In embodiments of the invention step (c) comprises in response to receipt of the directional beam of electromagnetic radiation and of the joining code from the electromagnetic radiation signal, joining the selected device to the network.

In embodiments of the invention, the device that is selected using the directional beam of electromagnetic radiation (in step (b)) also receives the joining code in the electromagnetic radiation signal (in step (a)). The selected device may receive the electromagnetic radiation signal containing the joining code (in step (a)) either before, after, or at the same time it is selected by the directional beam of electromagnetic radiation (in step (b)).

In embodiments of the invention, step (c) comprises comparing the joining code received by the selected device, from the electromagnetic radiation signal, to one or more access codes for the network and if the joining code matches an access code for the network then the selected device is joined to the network.

In embodiments of the invention, if the joining code is not an access code for the network then the lighting device is not joined to the network.

This comparison, and the authorisation of the joining of the lighting device to the network, may be performed by a network controller (of the network).

Optionally step (c) comprises the steps of, in response to receipt of the directional beam of electromagnetic radiation and of the joining code from the electromagnetic radiation signal, entering the selected device into a joining mode, in which the selected device is joined to the network if the received joining code is an access code for the network.

In embodiments of the invention, in the joining mode the joining code received by the selected device (that is in the joining mode) is compared to one or more access codes for the network and if the joining code matches an access code for the network then the device is joined to the network (as referred to above).

For example, when the lighting device is in the joining mode it may attempt to join the network using the joining code it has received. It may perform a scan to identify a network and then attempt to join the identified network with the joining code. In this respect, it may broadcast a signal that is received by the network controller which, in response, transmits a signal back to the lighting device, identifying the network that the lighting device can join. The lighting device may then transmit the joining code that it has received to the network controller. The network controller may then perform the comparison and the authorisation of the joining of the lighting device to the network.

Alternatively, or additionally, when the lighting device is in the joining mode it may respond to an interrogation signal from the network controller, to provide the network controller with the joining code that the lighting device has received. The network controller may then perform the comparison and the authorisation of the joining of the lighting device to the network.

The scan and/or interrogation signal may be of any suitable type. The scan and/or interrogation signal may be an electromagnetic radiation signal. For example, the scan and/or interrogation signal may be a radio frequency signal, Wi-Fi signal, Bluetooth signal, etc.

The, or each, lighting device may have a non-joining mode. It may be in the non-joining mode if the lighting device has not received the directional beam of electromagnetic radiation or the joining code from the electromagnetic radiation signal.

In the non-joining mode the lighting device is not joined to the network. In this respect, in the non-joining mode the lighting device does not attempt to join the network.

For example, in the non-joining mode the lighting device may not perform a scan to identify a network and/or may not attempt to join an identified network with any received joining code.

Alternatively, or additionally, in the non-joining mode the lighting device may not respond to an interrogation signal from the network controller, with the joining code.

The mode of the lighting device may be changed from the joining mode to the non-joining mode when a cancellation event occurs, for example after a certain period of time has elapsed without the lighting device being joined to the network.

The, or each, lighting device may be in a networked mode when it is part of the network (i.e. when it has been joined to the network). The, or each, lighting device may be in the networked mode when it is part of the network and paired with the remote control device.

Optionally, when the lighting device is in the networked mode, it may not be entered into the joining mode, i.e. it may not be entered into the joining mode in response to receipt of the directional beam of electromagnetic radiation and of the joining code from the electromagnetic radiation signal. This prevents a lighting device that is joined to the network from trying to re-join the network if it subsequently receives the directional beam of electromagnetic radiation and of the joining code from the electromagnetic radiation signal, for example by accident when a user is trying so select another lighting device to be joined to the network.

The, or each, lighting device may be in a non-networked mode when it is not part of the network. In this respect, each lighting device may be configured such that when it is disconnected from the network, its mode is changed from the networked mode to the non-networked mode. In the non-networked mode, the lighting device may be in the non-joining mode or the joining mode. In this respect in the non-networked mode, the lighting device may be in the non-joining mode unless it has been entered into the joining mode (in response to receipt of the directional beam of electromagnetic radiation and of the joining code from the electromagnetic radiation signal).

The, or each, lighting device may be configured such that it does not receive the electromagnetic radiation signal containing the joining code unless it receives the directional beam of electromagnetic radiation. The, or each, lighting device may be configured such that it does not read and/or store the joining code in any electromagnetic radiation signal, unless it receives the directional beam of electromagnetic radiation.

Steps (a) and (b) may occur at the same time. In this respect the lighting device may be entered into the joining mode if it receives the directional beam of electromagnetic radiation and the electromagnetic radiation signal containing the joining code, at the same time. Optionally the lighting device may only be entered into the joining mode if it receives the directional beam of electromagnetic radiation and the electromagnetic radiation signal containing the joining code, at the same time.

Alternatively, steps (a) to (d) may occur sequentially in the order presented (i.e. step (a) then step (b) then step (c) and then step (d).

In this respect, step (a) may occur before step (b). In this case the one or more lighting devices, that the joining code is transmitted to, may store the joining code (in a memory). In this case, the lighting device may be put into the joining mode once it then receives the directional beam of electromagnetic radiation.

Alternatively step (b) could occur before step (a). In this case, the lighting device may store (in a memory) that it had received the directional beam of electromagnetic radiation. The lighting device may be put into the joining mode once it then receives the joining code in the electromagnetic radiation signal.

For either of the cases where step (a) occurs before step (b) or vice-versa, optionally the lighting device may only be put into the joining mode if the directional beam of electromagnetic radiation and the electromagnetic radiation signal are both received before a cancellation event occurs. The cancellation event may be after a certain period of time has elapsed, from whichever of steps (a) or (b) occurred first. Alternatively, or additionally, the cancellation event may be if a different lighting device is joined to the network.

The network controller may be configured to have a joining mode and a non-joining mode. In the joining mode, the network controller may allow the selected device to be joined to the network if the joining code received by the selected device is an access code for the network. In the non-joining mode, the network controller may not allow the selected device to be joined to the network, even if the joining code received by the selected device is an access code for the network.

In this respect, step (c) may comprise in response to receipt of the directional beam of electromagnetic radiation and of the joining code from the electromagnetic radiation signal, by the selected device, joining the selected device to the network if the received joining code is an access code for the network and if the network controller is in a joining mode.

The network controller may be entered into the joining mode by the receipt of the second joining code by the network controller. The network controller may be entered into the non-joining mode by the joining of a lighting device to the network. The network controller may be entered into the non-joining mode by the joining of a lighting device to the network and the pairing of the lighting device with the remote control device.

Optionally the directional beam of electromagnetic radiation is a different beam to the electromagnetic radiation signal that contains the joining code.

Optionally the directional beam of electromagnetic radiation is of a first type of electromagnetic radiation and the electromagnetic radiation signal containing the joining code is of a second type of electromagnetic radiation.

Optionally in step (a) the electromagnetic radiation signal containing the joining code is transmitted to a plurality of lighting devices at the same time. In this respect, the electromagnetic radiation signal may cover an area or volume that includes a plurality of lighting devices. However, in embodiments of the invention, in step (b) only one lighting device (e.g. of the plurality of lighting devices) is selected by directing the directional beam of electromagnetic radiation onto a sensor of the lighting device. Accordingly only the selected lighting device is placed in the joining mode and so only the selected device is joined to the network (if the received joining code is an access code for the network).

The electromagnetic radiation signal containing the joining code may be a beam of electromagnetic radiation. It may be a wider beam than the directional beam of electromagnetic radiation.

In this respect, optionally the directional beam of electromagnetic radiation is narrow enough that it may be received by only one lighting device. Optionally the beam containing the joining code is wide enough that it may be received by more than one lighting device.

This may allow the directional beam of electromagnetic radiation to be used to select a single lighting device to be joined to the network and paired with the remote control device, whilst also allowing a user to not have to accurately aim the electromagnetic radiation beam containing the joining code. This may facilitate the transmission of the joining code, which may take longer than the selection using the directional beam of electromagnetic radiation.

The electromagnetic radiation signal containing the joining code may be of any suitable type, including an infrared signal or radio frequency signal, for example.

The directional beam of electromagnetic radiation may be of any suitable type. It may be a laser beam. It may be of electromagnetic radiation of any frequency, including of visible light, an infrared laser or ultraviolet laser, for example.

Alternatively, or additionally, the directional beam of electromagnetic radiation may be a beam of visible light from a light emitting diode (LED).

The directional beam of electromagnetic radiation may be visible (to a human), for example a visible laser beam or beam of visible light from an LED. This is advantageous in that is may assist a user directing the beam onto the sensor of the selected lighting device.

The joining code may be transmitted by the directional beam of electromagnetic radiation. In this case, the joining code may only be transmitted to one lighting device (i.e. the selected lighting device).

In this case, the directional beam of electromagnetic radiation both selects a lighting device, by being received by its sensor, and transmits the joining code to the selected device. For example, the directional beam of electromagnetic radiation may be suitably modulated to contain the joining code. It will be appreciated that, in this case, the electromagnetic radiation signal in step (a) and the directional beam of electromagnetic radiation in step (b) refer to the same signal, i.e. the directional beam of electromagnetic radiation is the electromagnetic radiation signal.

The access code for the network, and the joining code, may be of any type, including one or more of numerical, alphanumerical or pictorial (for example a scanned QR code).

The network may be a secure network. In this respect, the access code for the network may be a code that is required for a device, for example a lighting device, to join the network.

The lighting system may comprise a network controller. The network controller may be part of the network. The network controller may be configured to authorise the joining of devices to the network (e.g. lighting devices).

The network controller may be configured to establish a secure datagram transport layer security (DTLS) session to authenticate and authorise the joining of a lighting device to the network.

Optionally the network controller is configured to carry out steps (c) and/or (d).

Optionally the network controller communicates wirelessly with the lighting devices.

The network controller may comprise a router, which may be a border router. The router may be configured to carry out the above described functions of the network controller.

There may be two-way communication between the network controller and the lighting devices. In this respect each lighting device may comprise a network adaptor. The network adaptor may comprise a transmitter for transmitting a signal to the network controller, either directly or via the network and a receiver for receiving a signal from the network controller, either directly or via the network.

In step (a), the electromagnetic radiation signal containing the joining code, i.e. the first joining code, may be emitted by a joining code emitter.

In step (b), the directional beam of electromagnetic radiation may be emitted by a directional beam emitter.

The joining code may be generated by a joining code generator device.

The joining code generator device may be configured to generate a random joining code, for example using a random number generator.

The remote selection device (see below) may comprise the joining code generator device.

The access code may be a predetermined code set by the network controller. In this respect, the access code may be fixed. Alternatively, the access code may be a changeable code. For example it may be set by a user and may be changeable by the user.

In this respect, optionally:

in step (a) the joining code transmitted to one or more lighting devices using an electromagnetic radiation signal is a first joining code;

a second joining code is received by a network controller; and the access code for the network is the second joining code, or an associated joining code.

An 'associated' joining code may be a code that is derivable from the second joining code. For example, it may an encrypted version of the second joining code that can be decrypted to the second joining code.

The access code may be the second joining code.

In embodiments of the invention the access code is set by the network controller to be the second joining code, or an associated joining code.

Step (a) may occur before the network controller receives the second joining code. Alternatively, the network controller may receive the second joining code before step (a). In this respect, it will be appreciated that references to a 'first' joining code and a 'second' joining code do not refer to a sequential order, i.e. it is not necessary that the 'first' occurs before the 'second'. It will also be appreciated that step (a) may occur at the same time that the network controller receives the second joining code.

The second joining code may be input by a user to an input device. In this case, the input device may transmit the second joining code to the network controller. It will be appreciated that the second joining code may be transmitted directly from the input device to the network controller, or via one or more intermediary devices, for example via a Wi-Fi router. The input device may be connected to the network.

The input device may be the remote control device. This may provide a convenient means of inputting the second joining code, as this is the same device that is used to control the selected lighting device. Alternatively the input device may be a separate device, for example the remote selection device (see below).

Optionally the first joining code is displayed to a user and the user reads the first joining code and inputs it, to the input device, as the second joining code. The first joining code may be displayed by the remote selection device.

The second joining code may be generated by a second joining code generator device. This may remove the requirement for the second joining code to be input by a user. The remote control device may comprise the second joining code generator device.

The second joining code generator device may transmit the second joining code to the network controller.

The second joining code may be transmitted, as the first joining code, to the one or more lighting devices using the electromagnetic radiation signal. In this respect, the second joining code may be used as the first joining code. The second joining code may be transmitted to the joining code emitter (that transmits the first joining code), to form the first joining code. In this case the second joining code is then transmitted, as the first joining code, in the electromagnetic radiation signal, in step (a).

For example, the second joining code may be transmitted from the second joining code generator device, to the joining code emitter, to form the first joining code. Where the second joining code is input to an input device, the second joining code may be transmitted from the input device, to the joining code emitter, to form the first joining code.

In step (c), the joining of the selected device to the network may comprise a secure key exchange between the network controller and the selected device.

Optionally the method comprises assigning a network address to the joined device. This may occur in step (d). The network address may be any suitable type of network address for example an IP address, which may be an IPv6 address or any other suitable type of IP address.

Optionally step (d) comprises transmitting an interrogation signal from the remote control device, across the network, to identify a new lighting device that has been joined to the network and in response to the receipt of the interrogation signal, by the joined device, the joined device transmits its network address to the remote control device, for example via the network.

The directional beam of electromagnetic radiation and/or the electromagnetic radiation signal containing the joining code may be emitted by a remote selection device. In this respect, the joining code emitter and/or the directional beam emitter may be a remote selection device. Optionally both the directional beam of electromagnetic radiation and the electromagnetic radiation signal containing the joining code are emitted by a remote selection device, i.e. by the same remote selection device. This may provide for ease of use as, in that case, both the electromagnetic radiation signal containing the joining code and the directional beam of electromagnetic radiation are emitted by the same device.

The remote selection device may be user-operated.

The directional beam of electromagnetic radiation may be emitted by a user-operated remote selection device. The electromagnetic radiation signal containing the joining code may be emitted by a user-operated remote selection device.

The remote selection device may be portable. In this respect, the remote selection device may be movable to different locations, to selected different lighting devices to be paired. The remote selection device may be handheld. In this respect, the remote selection device may be of a size and weight that allow it to be handheld.

The joining code may be displayed to a user. In this respect, the joining code may be displayed by the remote selection device. This may provide a compact and easy to use arrangement, whereby a user can use the remote selection device to both select a lighting device to be paired and to display the joining code. Alternatively, or additionally, the joining code may displayed by the remote control device. Alternatively, or additionally, the joining code may displayed by a separate device.

In embodiments of the invention the network is a data network. In this respect, data is transmitted to and from each device on the network. It will be appreciated that references to a 'network' are to the network of lighting units (which also may comprise a network controller, one or more routers that control the network, etc.)

Optionally the network is a wireless network.

As the lighting units are joined to a wireless network, this may mitigate the risk of incorrect wiring causing errors during the joining of the lighting units to the network.

Each lighting device may be connected in the network such that each lighting device can transmit and receive data communication signals, optionally wirelessly, across the network, i.e. to other lighting devices on the network, optionally every other lighting device on the network. Each lighting device may comprise a network adaptor that is configured to allow the lighting device to transmit and receive the data communication signals.

The wireless network may be a mesh network.

The remote control device may be a commissioning device for the network.

The wireless network may be of any suitable type, including a network manufactured by Silicon Labs and known as a 'Thread' network that uses a protocol known as the 'Thread' protocol or a wireless mesh network known as a 'ZigBee' wireless mesh network, for example.

Alternatively the network may be a wired network, for example using DMX connections.

The network may be of one or more of said lighting devices, preferably of a plurality of said lighting devices.

Optionally steps (a) to (d) are repeated to join a plurality of lighting devices to a network and to pair the lighting devices with the remote control device such that each lighting device is controllable, on the network, by the remote control device.

In this respect, optionally the pairing is such that each lighting device is selectable on the network. Optionally the pairing is such that each lighting device is individually controllable on the network (i.e. independently of the other lighting devices in the network), by the remote control device. The pairing may be such that that one or more lighting devices are controllable as a group, by the remote control device.

Optionally the joining code that is transmitted in the electromagnetic radiation signal is the same each time a lighting device is joined to the network and paired with the remote control device. In this respect, the same joining code may be used to join each lighting device to the network. This may allow for a plurality of lighting devices to be joined to the network and paired with the remote control device one after the other in a relatively quick and simple way. In this respect, the input device (for the second joining code) may be configured such that after the second joining code has been input a first time, the same joining code may be used automatically (as the second joining code) each time a subsequent lighting device is joined to the network and paired with the remote control device. The second joining code generator device may be configured to generate the same second joining code each time a lighting device is joined to the network and paired with the remote control device.

This may be advantageous in that each lighting device may be selected and paired individually, even if the lighting devices are eventually grouped together (see below).

Optionally the pairing comprises pairing a graphical representation on a display of the remote control device with the lighting device such that selecting the graphical representation selects the lighting device for receipt of control commands from the remote control device. It will be appreciated that the control commands may be transmitted from the remote control device to the lighting device via one or more intermediary devices, for example a Wi-Fi router, the network controller and/or across the network.

The graphical representation may be of any suitable type, for example a display icon, including a picture, letter, number, etc.

Optionally the, or each, graphical representation can be moved, on the display of the remote control device, to correspond to a physical location of the, or each, lighting device. The display may be any suitable display, including an electronic display, a screen, including a touch screen, etc.

Optionally the graphical representations are groupable into groups such that a selection of a group selects all the lighting devices, that are paired with the graphical representations in that group, so as to receive the same control commands from the remote control device.

Optionally each lighting device provides a visual indication when:

- it has received the electromagnetic radiation signal containing the joining code;

its sensor has received the directional beam of electromagnetic radiation;

it is attempting to join to the network; and/or it has been paired with the remote control device.

The visual indication may be of any suitable type, including via an indicator light, such as flashing of the light, a changing of the colour of the light, a turning of the light on or off, a movement of the lighting unit, etc.

The, or each, lighting device may be of any suitable type. For example, the lighting device may be a downlight, spot light, recessed, track mounted, monopoint etc. The lighting device may be for providing light to a space, including an indoor space, e.g. a room, or an outdoor space, for example to provide a particular lighting effect or scene, in combination with other lighting devices.

The, or each, lighting device may be inaccessible to a user, for example to a user located on the floor, or the ground (where the space is outdoor), of a space in which the lighting devices are located. In this respect, the, or each, lighting device may be located at a height that is too high to be reached by a person standing on the floor, or the ground, of a space in which the lighting devices are located. For example, the, or each, lighting device may be located in the ceiling of a room, high up on a wall of the room, or suspended high up outdoors.

Optionally one or more properties of the lighting device is controllable by the remote control device.

For example, at least one of the following properties may controllable by the remote control device:

(i) the orientation of the lighting device;

(ii) the translational position of the lighting device;

(iii) the brightness of the lighting device;

(iv) the colour of light emitted by lighting device;

(v) the colour temperature of light emitted by the lighting device;

(vi) the width of the beam of light from the lighting device;

(vii) the on or off state of the lighting device.

The, or each, lighting device may have one or more controllable lamps and one or more actuators configured to move the lamps. The, or each, lamp may be of any suitable type, including an LED, incandescent lamp, fluorescent lamp or halogen lamp, for example.

The, or each, lighting device may comprise a control unit for controlling the lamps, actuators and/or a network adaptor. The control unit may include a microprocessor, which may include a memory.

According to a second aspect of the invention there is provided a method of controlling a lighting device in a network, the method comprising:

(a) joining the lighting device to a network and pairing the lighting device with a remote control device by the method of the first aspect of the invention; and (b) controlling the lighting device with the remote control device.

The, or each, paired lighting device in the network may additionally controlled by a second remote control device. The second remote control device may control all of the paired lighting devices together. The second remote control device may control the paired lighting devices via a control command that overrides the control command from the first remote control device.

The second remote control device may transmit control signals to the lighting devices via an interface, for example an interface known as a Digital Addressable Lighting Interface (DALI), a DMX interface (e.g. a DMX512 interface) or any other suitable interface. The second remote control device may be configured to store a particular configuration, of all of the lighting devices on the network, and to recall and command the lighting devices to adopt this configuration With this arrangement, a user may use the first remote control device to control each lighting device individually (e.g. tilt angle, pan angle, brightness etc.) and use the second remote control device to control all the lighting devices, on the network, together in the same way.

The first remote control device may be used, for example, by a lighting designer, to produce a desired overall lighting mode. The second remote control device may be used, for example, by a member of staff during an event, to adjust the lighting units together, for example to adjust the brightness of all the lighting units together, for example to set them to previously recorded configurations or scenes.

According to a third aspect of the invention there is provided a lighting system, for lighting a space, the lighting system comprising a remote control device and a network of lighting devices, wherein at least one of the lighting devices has been joined to the network and paired with the remote control device by the method of the first aspect of the invention.

Optionally the network comprises a plurality of lighting devices that have been joined to the network and paired with the remote control device by the method of the first aspect of the invention.

According to a fourth aspect of the invention there is provided a lighting system, for lighting a space, wherein the lighting system comprises:

a network;

a network controller;

a remote control device;

a joining code emitter, configured to transmit a joining code to one or more lighting devices using an electromagnetic radiation signal;

a directional beam emitter, configured to select a lighting device to be joined to the network and paired with a remote control device by directing a directional beam of electromagnetic radiation onto a sensor of a lighting device; and a lighting device configured to receive the directional beam of electromagnetic radiation and the joining code from the electromagnetic radiation signal;

wherein the network controller and lighting device are configured such that in response to receipt, by the lighting device, of the directional beam of electromagnetic radiation and of the joining code from the electromagnetic radiation signal, the lighting device is joined to the network if the received joining code is an access code for the network;

and wherein the network controller and lighting device are configured such that the joined device is paired with the remote control device so that the joined device is controllable, on the network, by the remote control device.

The lighting system may comprise a plurality of said lighting devices. The lighting system may comprise one or more lighting devices that are not part of the network, but are to be joined to the network.

The lighting system may comprise a plurality of lighting devices that are not part of the network, but are to be joined to the network.

The network may comprise one or more lighting devices.

Features of the system, or any apparatus, of the invention may be configured to carry out the function carried out by that feature in the method of the invention.

For example, the directional beam emitter and the joining code emitter may be configured to emit different beams.

The joining code emitter may be configured such that the electromagnetic radiation signal containing the joining code is transmitted to a plurality of lighting devices.

The directional beam emitter may be configured such that the directional beam of electromagnetic radiation is narrow enough that it is received by only one of the lighting devices. The joining code emitter may be configured such that the electromagnetic radiation signal containing the joining code is a beam that is wide enough that it is received by more than one of the lighting devices.

The directional beam emitter may be configured such that the joining code is transmitted by the directional beam of electromagnetic radiation. In this case, the joining code emitter and the directional beam emitter may be formed by the same device, for example a user-operated remote selection device.

The lighting system may comprise a joining code generator device configured to generate the joining code.

The network controller may be configured to receive a second joining code and to set the access code for the network to be the second joining code, or an associated joining code.

The lighting system may comprise an input device configured to receive the second joining code and to transmit the second joining code to the network controller.

The lighting system may comprise a display device, configured to display the first joining code, in a readable form.

The lighting system may comprise a second joining code generator device, configured to generate the second joining code, which may be configured to generate the second joining code randomly.

The second joining code generator device may be configured to transmit the second joining code to the joining code emitter. In this case, the joining code emitter may be configured such that the received second joining code is transmitted, as the first joining code, to the one or more lighting devices using the electromagnetic radiation signal.

The network controller may be configured to assign a network address to the joined device.

Optionally the network controller is configured to repeat the joining and pairing process so as to join a plurality of lighting devices to the network and to pair the lighting devices with the remote control device such that each lighting device is controllable, on the network, by the remote control device.

The joining code emitter may be configured to emit the same joining code each time a lighting device is to be joined to the network and paired with the remote control device.

Optionally the remote control device comprises a display and that network controller is configured to pairing a graphical representation on the display with the joined lighting device such that selecting the graphical representation selects the lighting device for receipt of control commands from the remote control device.

Optionally the remote control device is configured such that the, or each, graphical representation can be moved, on the display, to correspond to a physical location of the, or each, lighting device that has been joined to the network.

Optionally the graphical representations are groupable into groups such that a selection of a group selects all the lighting devices, that are paired with the graphical representations in that group, to receive the same control commands from the remote control device.

Optionally the lighting system comprises a second remote control device that is configured to control the, or each, lighting device on the network. The second remote control device may be configured to control all of lighting devices on the network together.

According to a fifth aspect of the invention there is provided a lighting device for being joined to a network and paired with a remote control device, the lighting device comprising:

- a sensor configured to receive a directional beam of electromagnetic radiation; and
- a receiver configured to receive an electromagnetic radiation signal containing a joining code;
- wherein the lighting device is configured such that in response to receipt of the directional beam of electromagnetic radiation and of the joining code from the electromagnetic radiation signal, it is joinable to a network if the received joining code is an access code for the network;
- and wherein the lighting device is configured such that it is controllable, on a network that it has been joined to, by a remote control device.

In embodiments of the invention the lighting device is configured such that in response to receipt of the directional beam of electromagnetic radiation and of the joining code from the electromagnetic radiation signal, it is joined to a network if the received joining code is an access code for the network. In embodiments of the invention the lighting device is configured such that in response to receipt of the directional beam of electromagnetic radiation and of the joining code from the electromagnetic radiation signal, it is entered into a joining mode in which it is joined to a network if the received joining code is an access code for the network.

The electromagnetic radiation signal containing the joining code may be a different signal to the directional beam of electromagnetic radiation. In this respect, the sensor may not be the receiver, i.e. they may be different entities. Alternatively, the electromagnetic radiation signal containing the joining code may be the directional beam of electromagnetic radiation. In this respect, the sensor may also be the receiver, i.e. it both receives the directional beam of electromagnetic radiation and the joining code.

According to a sixth aspect of the invention there is provided a remote selection device comprising:

- a directional beam emitter configured to emit a directional beam of electromagnetic radiation to select a lighting device to be joined to a network and paired with a remote control device; and
- a joining code emitter configured to emit an electromagnetic radiation signal, containing a network joining code, to one or more lighting devices.

The electromagnetic radiation signal containing the joining code may be a different signal to the directional beam of electromagnetic radiation. In this respect, the directional beam emitter may not be the joining code emitter, i.e. they may be different entities. Alternatively, the electromagnetic radiation signal containing the joining code may be the same as the directional beam of electromagnetic radiation. In this case, the directional beam emitter may also be the joining code emitter.

Optionally the remote selection device comprises a joining code generator. The joining code generator may be configured to generate a random joining code.

According to a seventh aspect of the invention there is provided a kit of parts comprising:

a network controller;

a joining code emitter configured to transmit a joining code to one or more lighting devices using an electromagnetic radiation signal;

a directional beam emitter configured to select a lighting device to be joined to a network and paired with a remote control device by directing a directional beam of electromagnetic radiation onto a sensor of a lighting device; and a lighting device configured to receive the directional beam of electromagnetic radiation and the joining code from the electromagnetic radiation signal;

wherein the network controller and the lighting device are configured such that in response to receipt, by the lighting device, of the directional beam of electromagnetic radiation and of the joining code from the electromagnetic radiation signal, the lighting device is joined to the network if the received joining code is an access code for the network; and such that the joined device is paired with a remote control device so that the joined device is controllable, on the network, by the remote control device.

Optionally the kit of parts comprises a remote control device.

The kit of parts may comprise a network. The kit of parts may comprise network components for forming a network.

According to an eighth aspect of the invention there is provided a computer program comprising instructions which, when the program is executed by a computer, cause the computer to carry out the steps of:

a) receiving or generating a joining code for a network;

b) transmitting the joining code to a network controller, to provide a basis for an access code for a network of lighting devices;

c) receiving data that a lighting device has been joined to a network; and d) pairing the joined lighting device with a graphical representation on a display such that selecting the graphical representation selects the lighting device for receipt of control commands.

In step (b), the access code for the network may be the joining code, or an associated joining code.

The computer program product may be configured to transmit the same joining code, to the network controller, each time a lighting device is to be joined to the network.

The remote control device may be provided with the computer program product. The remote control device may be operated by the computer program product. The remote control device may comprise a computer configured to execute the program.

Step (c) may comprise receiving and recording a network address for the lighting device that has been joined to the network.

According to a ninth aspect of the invention there is provided a network controller configured:

to receive a first joining code from a lighting device, that is attempting to join the network in response to the receipt, by the lighting device, of the first joining code in an electromagnetic radiation signal received by the lighting device and of a directional beam of electromagnetic radiation;

to set an access code for the network; to authorise the joining of the lighting device to the network if the first joining code is the access code for the network;

and to pair the joined device with a remote control device such that the joined device is controllable, on the network, by the remote control device.

The network controller may be configured to receive a second joining code and to set the access code for the network based on the second joining code. In this respect, the access code set for the network may be the second joining code, or an associated joining code.

The network controller may be configured to receive the second joining code from the remote control device.

The network controller may be configured to receive the same second joining code each time a lighting device is to be joined to the network.

The skilled person will readily understand that a network comprises two or more devices connected by a medium over which the devices can communicate. In the case of a wireless network, the medium may comprise an allocated frequency spectrum (e.g. an allocated radio frequency spectrum) for use in the transmission of wireless signals. In the case of a wired network, the medium may comprise electrical cables.

The skilled person will also readily understand that communication between devices on a network is typically enabled by a communication protocol. The communication protocol governs the form of messages that can be transmitted across the network between the devices joined to the network. Thus a method of joining a device to a network typically comprises configuring the device to conform to the communication protocol of the network.

The skilled person will readily understand that when a device joins a network there is a change in the capability of the joining device to communicate with other devices already joined to the network. The skilled person will understand that a change in a status of a device which does not result in any substantive change in the device's ability to communicate with other devices on the network would not constitute that device having 'joined' a network. In this respect, the skilled person will readily understand that merely grouping a device, that is already on a network, with one or more other devices that are already on the network, would not constitute the joining of the device to a 'network'.

The features of any of the above aspects of the invention may be combined with one or more features of any of the other aspects of the invention, in any combination. For example, the apparatus of the invention may incorporate any of the features described with reference to the method of the invention and vice versa.

Other preferred and advantageous features of the invention will be apparent from the following description.

DESCRIPTION OF THE DRAWINGS

Specific embodiments of the invention will now be described, by way of example only, with reference to the description and drawings.

DETAILED DESCRIPTION

Figure 1:
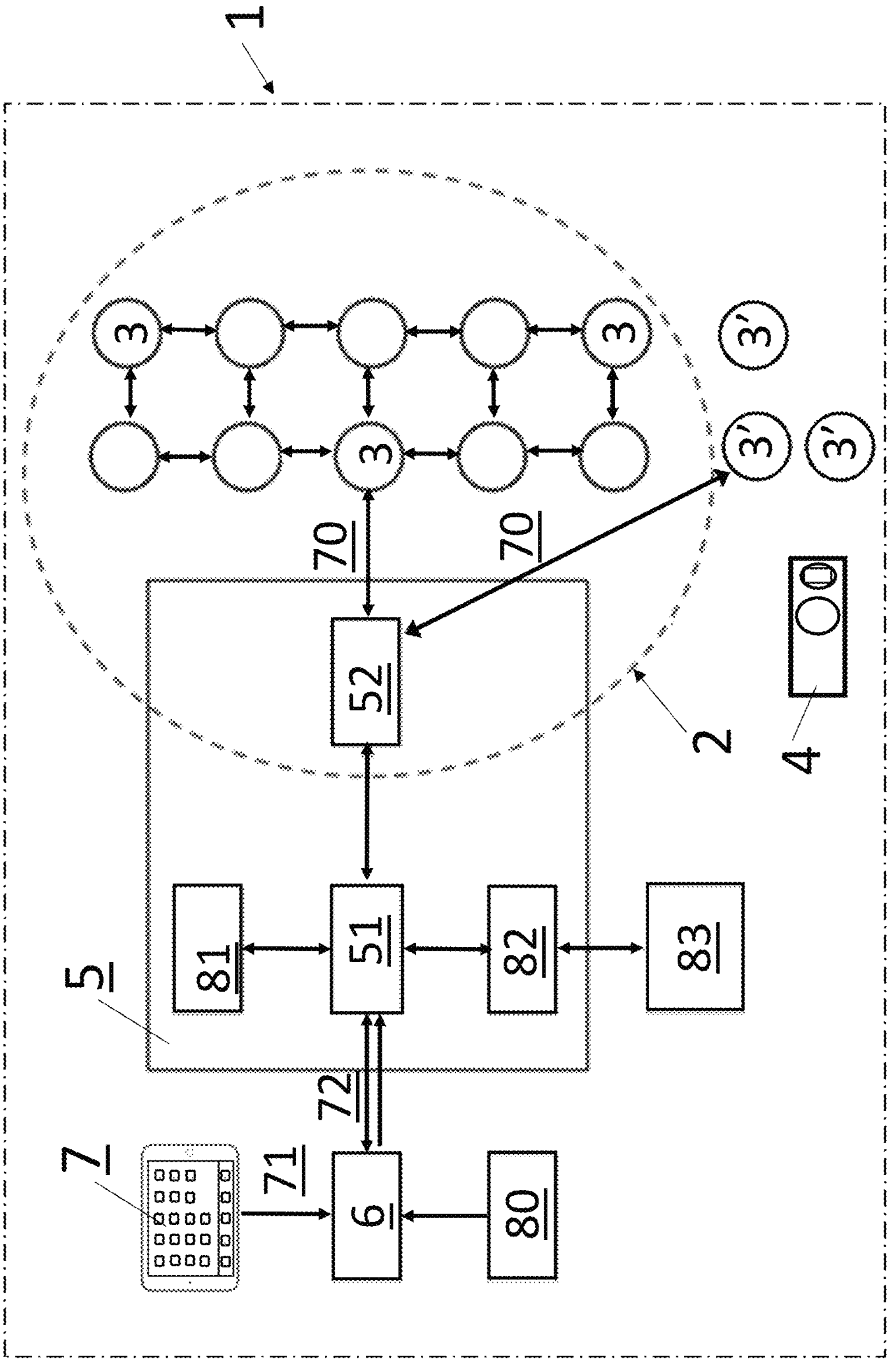
FIG. 1 is a schematic diagram of a lighting system according to a first embodiment of the present invention.

Referring to FIG. 1 there is shown a schematic view of a lighting system 1 according to a first embodiment of the invention.

The lighting system 1 comprises a wireless mesh network 2 of a plurality of lighting devices 3 (described in further detail below). The lighting system 1 is for illuminating a space with one or more lighting devices 3 that are connected in a network 2. The networked lighting devices 3 are individually selectable and controllable (as well as controllable in groups) to provide a desired overall lighting configuration. For example the system may be used to provide controllable lighting to a user space, such as function rooms, dining areas, art galleries, outdoor spaces etc.

In the currently described embodiment the network 2 comprises ten lighting devices 3 (it will be appreciated that, for clarity, in FIG. 1 only a selection of the lighting units 3 have been labelled (3)). However, it will be appreciated that the number of lighting devices 3 in the network 2 may be varied (and indeed the method below relates to the addition of further lighting devices 3' to the network 2).

The network 2 of lighting devices 3 is connected, via a network controller 5 (described below) to a remote control device 7. The remote control device 7 is user-operated and is portable. In this respect, the remote control device 7 is movable to different locations. The remote control device 7 is handheld. In this respect, the remote control device 7 is of a size and weight that allow it to be handheld. In the currently described embodiment the remote control device 7 is a smart tablet (e.g. an I-Pad or other smart tablet). The remote control device 7 may be of any suitable type, including a phone (e.g. a smart phone), a smart tablet, a laptop or desktop computer, for example.

Each lighting device 3 on the network 2 is paired with the remote control device 7 such that it is controllable, either individually or in groups (see below), on the network 2, by the remote control device 7. A method of joining a lighting device 3' to the network 2 and pairing it with the remote control device 7, such that it is controllable, on the network 2 by the remote control device 7, and the associated features of the lighting system 1, are described below.

Referring to FIGS. 1 to 5, the lighting system 1 comprises a portable handheld remote selection device 4. In this respect, the remote selection device 4 is of a size and weight which allows it to be easily carried by hand.

Figure 2:
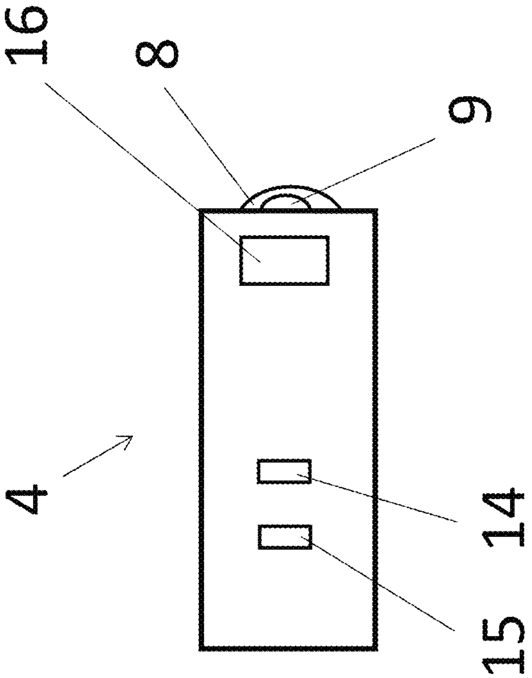
FIG. 2 shows a plan view of a remote selection device of the lighting system shown in FIG. 1.
Figure 3:
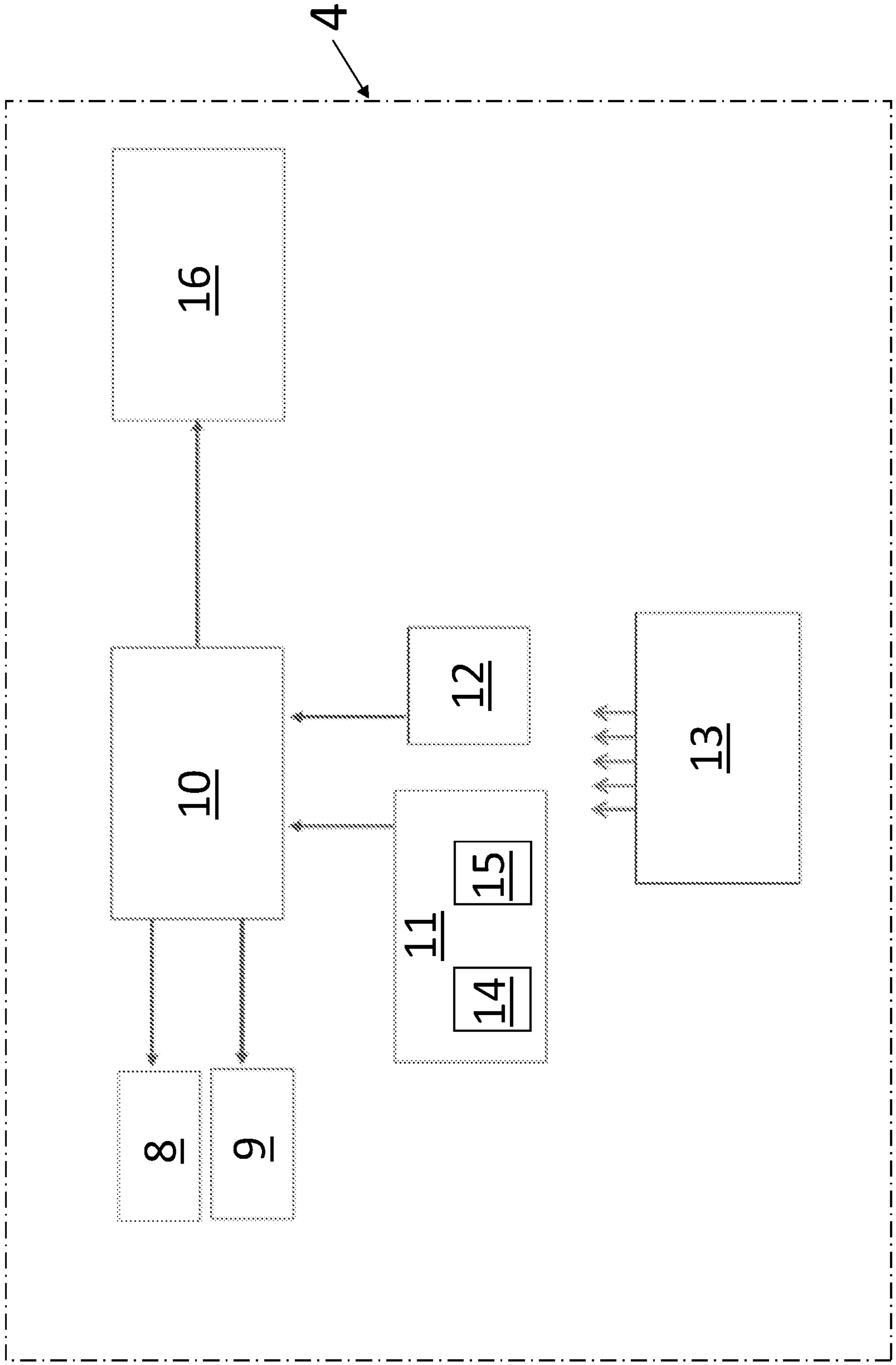
FIG. 3 is a schematic diagram of the remote selection device shown in FIG. 2.

The remote selection device 4 comprises an infrared beam emitter 8 (see FIGS. 2 and 3). The infrared beam emitter 8 comprises an infrared diode and driver. The infrared beam emitter 8 is configured to emit an infrared beam 31 that is encoded with a first joining code (described further below).

The remote selection device 4 also comprises a laser beam emitter 9. The laser beam emitter 9 comprises a laser diode and a driver. The laser beam emitter 9 is configured to emit a laser beam 30 of visible light.

The laser beam emitter 9 is configured to emit a directional laser beam 30 that is relatively narrow. The laser beam 30 is directional in that it can be directed to a specific location.

The laser beam 30 is narrow enough that a laser beam sensor 20 (see below) of a single lighting device 3' can receive the laser beam 30, without the laser beam sensors 20 of the other lighting devices 3' also receiving the laser beam 30. This allows the user 100 to accurately select one lighting device 3' to be joined to the network 2 and paired with the remote control device 7. In contrast, as discussed above, the infrared beam 31 containing the joining code is relatively wide. In this respect, it is wide enough that it is received by the sensors 21 of more than one of the lighting devices 3' to be paired.

The laser beam 30 may be modulated differently to laser beams of typical laser pointers, so that the pairing process is not triggered by typical laser pointers, etc.

The infrared beam emitter 8 and laser beam emitter 9 are each connected to respective outputs of a processor 10, in the form of a microcontroller, which is configured to control the infrared beam emitter 8 and laser beam emitter 9 in dependence on received control inputs from a first keypad 11.

The remote selection device 4 also comprises a liquid crystal display (LCD) 16 that is connected to a further output of the processor 10 (microcontroller).

The processor 10 is connected to a battery supply and power management circuit, designated schematically with the box labelled with reference numeral 13. It will be appreciated that the battery supply and power management circuit are suitably connected to the various components of the remote control device 4, but this is not shown for clarity.

A first input of the processor 10 is connected to a first keypad 11 and a second input of the processor 10 is connected to second keypad 12. The second keypad 12 relates to secondary functions of the remote selection device 4 that are not related to joining a lighting device to a network.

The first keypad 11 comprises a user operable button 14 for turning the infrared beam emitter 8 on/off and a user operable button 15 for turning the laser beam emitter 9 on/off.

In addition to its control functions (of the laser beam emitter 8, infrared beam emitter 9 and LCD 16), the processor 10 is configured to generate a first joining code. In the currently described embodiment the first joining code is an 8-digit alpha-numeric code. The processor 10 is configured to generate the first joining code randomly, using a random number generator.

The first joining code may be of any suitable type, including one or more of numerical, alphanumerical or pictorial (for example a QR code), for example.

The processor 10 controls the infrared beam emitter 8 such that the first joining code is encoded in the infrared beam 31 by modulation of the infrared beam 31. In this respect, When the button 14 is pressed, the joining code is generated and the infrared beam 31 is emitted, with the encoded joining code.

The processor 10 also communicates the first joining code to the LCD display 16, which displays the first joining code, in a readable form.

The lighting system 1 also comprises a plurality of lighting devices 3' (see FIG. 1) that are to be added to the wireless network 2 and paired with the remote control device 7. In the described embodiment three of the lighting devices 3' (to be added to the network 2 and paired with the remote control device 7) are shown. However the lighting system 1 may comprise differing numbers of lighting devices 3' to be joined to the network 2 and paired with the remote control device 7. In this respect the lighting system 1 may comprise one or more of the lighting devices 3'. Preferably the lighting system 1 comprises a plurality of the lighting devices 3'.

Each lighting device 3, 3' (i.e. each lighting device 3 on the network 2 and each lighting device 3' that is to be added to the network 2 and paired with the remote control device 7) is similar, or the same, and the below description applies to each lighting device 3, 3'.

Figure 5:
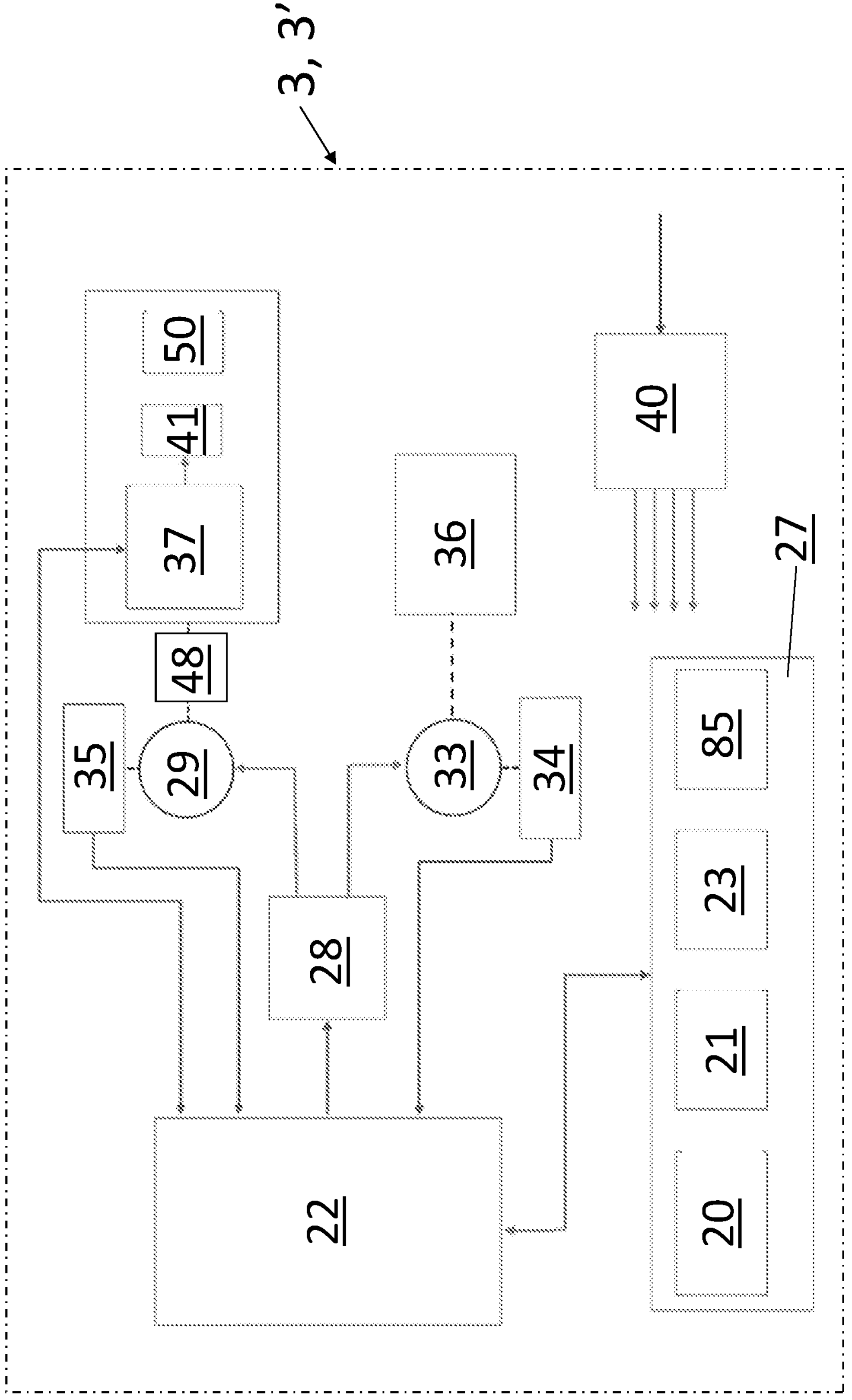
FIG. 5 shows a schematic diagram of each lighting device of the lighting system of the first embodiment.
Figure 6:
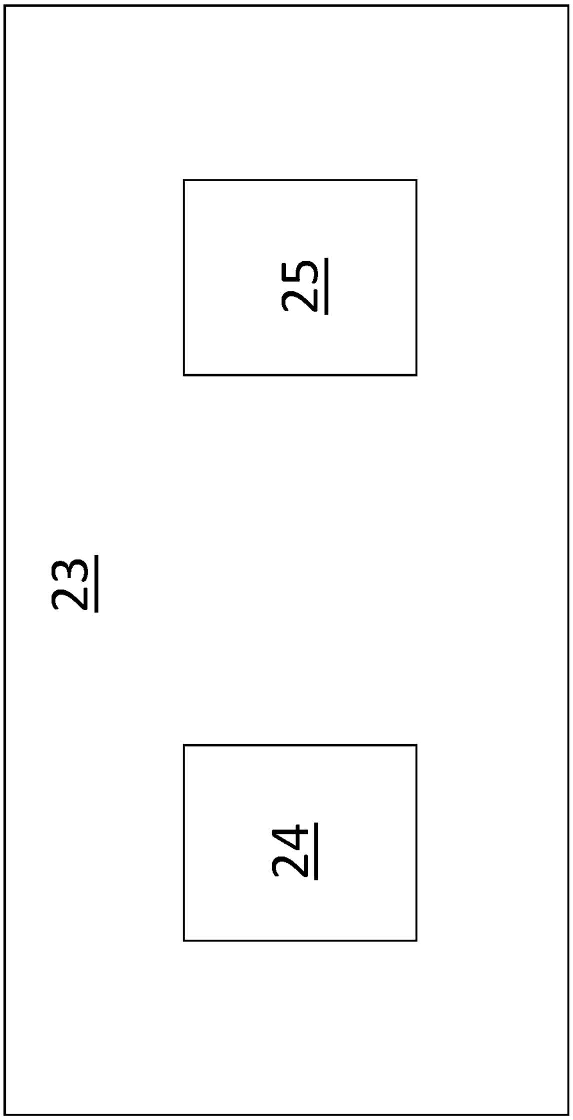
FIG. 6 shows a schematic view of a network adaptor of each lighting device of the lighting system of the first embodiment.
Figure 7:
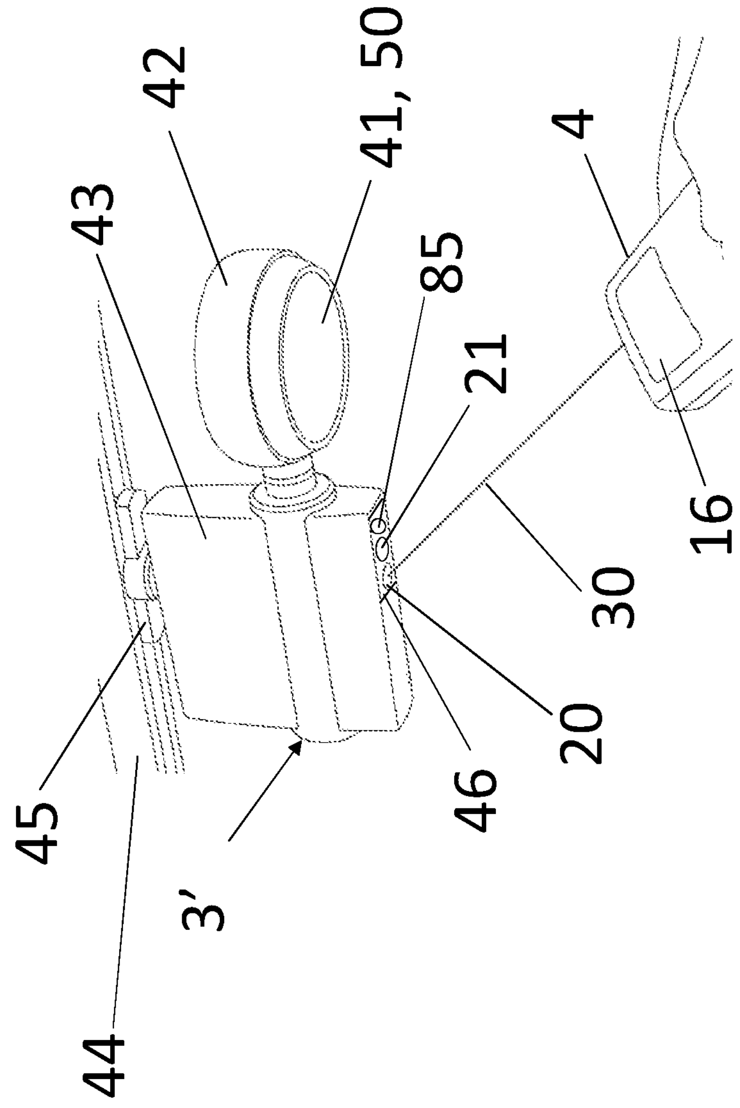
FIG. 7 shows a perspective view of a lighting device of the lighting system of the first embodiment, being selected by a laser beam from the remote selection device.

Referring to FIGS. 5 to 7, each lighting device 3, 3' comprises a lamp 41. In the currently described embodiment the lamp is in the form of a track mounted LED 41.

Each lighting device 3, 3' is mounted on the ceiling of a room (via the track, which is mounted on the ceiling). The lighting devices 3, 3' are configured to provide light to the room.

Each lighting device 3, 3' is inaccessible by the user 100 located on the floor of the room in which the lighting devices 3, 3' are located. In this respect each lighting device 3, 3' is located too high to be reached by the user 100.

It will be appreciated that the lighting unit may be of any suitable type. For example, it may be mounted in a ceiling or wall, or on a stand, it may be an uplighter or downlighter, a spot light or a monopoint. The lighting device may have any suitable type of light source, including one or more LEDs, incandescent lamps, fluorescent lamps, halogen lamps, etc.

The lamp 41 is mounted in a lamp housing 42 (see FIG. 7) that is rotatably mounted to a body 43 of the lighting device 3, 3' to allow the lamp housing 42 (and lamp 41) to rotate relative to the body 43, to control the tilt angle of the lamp 41. A lens 50 is mounted in front of the lamp 41 to focus the light emitted from the lamp LED 41.

The body 43 is rotatably mounted (via a rotatable track connector 45) to a ceiling mounted track 44 to allow the body 43 (and lamp 41) to rotate relative to the track 44, so as to control the pan angle of the lamp 41.

Each lighting device 3, 3' comprises a laser beam sensor 20, in the form of a photodiode, for sensing the laser beam 30. Each lighting device 3, 3' also comprises a receiver 21 for receiving the infrared beam 31.

The laser beam sensor 20 and infrared beam receiver 21 are each connected to respective inputs of a main processor 22, which is a microcontroller.

The laser beam sensor 20 and infrared beam receiver 21 are mounted on the underside of the body 43, behind a window 46. The window is transparent to the laser beam 30 and infrared beam 31 such that the laser beam 30 and infrared beam 31 can pass to the respective sensor 20 and receiver 21.

An array of indicator LEDs 85 is also mounted behind the window 46.

Each lighting device 3, 3' further comprises a network adaptor 23 (see FIGS. 5 and 6). The network adaptor 23 comprises a radio-frequency (RF) receiver 24 and transmitter 25 for providing two-way RF communication with each lighting device 3 (when it is part of the network 2) and with the network controller 5 (see below).

The laser beam sensor 20, infrared beam receiver 21, network adaptor 23 and LEDs 85 are formed as a printed circuit board 27.

An output of the main processor 22 is connected to a tilt motor 29 and a pan motor 33 via a motor drive circuit 28 such that the operation of the tilt motor 29 and pan motor 33 are controllable by the main processor 22. The tilt motor 29 and pan motor 33 are connected to a tilt mechanism 48 and pan mechanism 36 respectively, so as to control the panning and tilting of the lamp 41 of the lighting device 3, 3'.

The lamp LED 41 is connected, via an LED driver 37, to an output of the main processor 22.

A tilt position sensor 35 and pan position sensor 34 are configured to detect the tilt position and pan position of the lighting device 3, 3' and to provide this as respective inputs to the main processor 22. The main processor 22 controls the motors 29, 33 in dependence on the tilt position and pan position sensed by the sensors 35, 34 and on control commands received from remote control device 7 via the network controller 5 and network adaptor 23 of the lighting device 3.

The processor 22 is also configured to control the power supplied to the lamp 41 to adjust the brightness of the lamp 41 in dependence on the control commands.

A mains connector 40 connects the components of the lighting device 3, 3' to a mains electrical power supply. It will be appreciated that electrical wiring, that connects the different components of the lighting unit 3, 3' to the mains connector 40 is omitted from FIG. 5 for clarity.

Referring back to FIG. 1, the network controller 5 comprises a processor 51. An output of the processor 51 is connected to a border router 52. The border router 52 is configured to provide two-way RF communication 70 with the receiver 24 and transmitter 25 of the network adaptor 23 of each lighting device 3, 3', either directly (e.g. if the lighting device 3' is not on the network 2) or via the mesh network 2 (if the lighting device 3 in on the network).

In the currently described embodiment the RF communication 70 is a 2.4 GHz RF signal. However, it will be appreciated that any suitable frequency and any suitable type of electromagnetic radiation signal may be used for the wireless mesh network, including Wi-Fi, Bluetooth, etc.

The border router 52 is configured to control and manage the wireless mesh network 2. It is also configured to control the security of the network and, in particular to control the authorisation and joining of lighting devices 3' to the network 2 (as described in more detail below).

Arrays of indicators and buttons 81 are connected to an input of the processor 51 for operating and displaying status information of the network controller 5.

The network 2 also comprises a plurality of routers, including a leader router, arranged in the mesh network 2 to provide for communication across the mesh network 2. Such an arrangement of routers in a mesh network is well known, and so will not be described in any further detail.

The lighting system 1 also comprises a Wi-Fi router 6. The remote control device 7 is connected by a Wi-Fi signal 71 to the Wi-Fi router 6 and the Wi-Fi router 6 is connected by a wired Ethernet connection 72 to the processor 51 of the network controller 5. A Power Over Ethernet (POE) power supply 80 supplies electrical power to the Wi-Fi router 6 and from the Wi-Fi router 6 to the processor 51 of the network controller 5, via the wired Ethernet connection 72, so as to supply power to the network controller 5.

In the currently described embodiment the mesh network 2 is of the type known as a 'Thread' network, provided by Silicon Labs, and uses a protocol known as the 'Thread' protocol. Details of the 'Thread' protocol and of 'Thread' networks would be known to the person skilled in the art. For example such details are provided at https://www.silabs.com/documents/public/user-guides/user-guides/ug103-11-fundamentals-thread.pdf. The network controller 5 is a 'Thread Mediator' and the network adaptor 23 is a 'Thread module'. The remote control device 7 acts as an external commissioning device.

The border router 52 is configured to only permit a lighting device 3' to be added to the network 2 if the lighting device 3' provides an access code for the network 2 that is set by a user via a second joining code that is input into the remote control device 7 (as described in more detail below).

Figure 8:
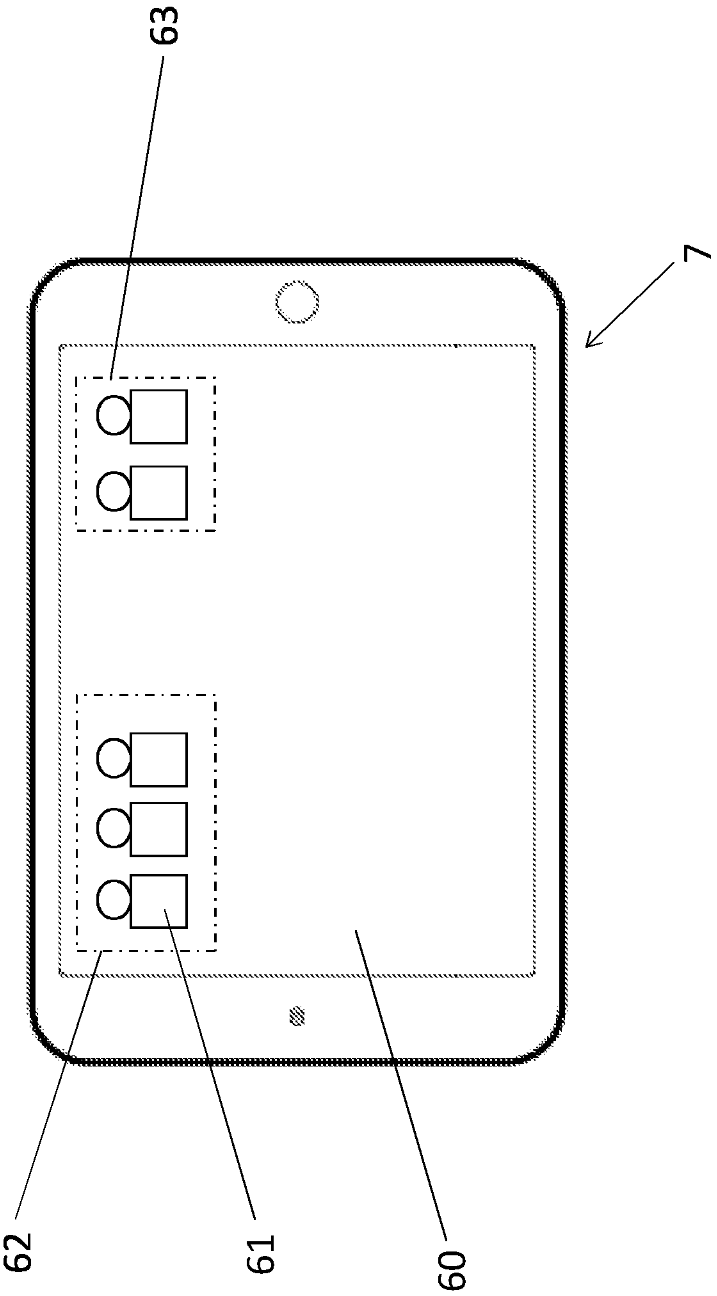
FIG. 8 shows a front view of a remote control device of the lighting system of the first embodiment.

With reference to FIG. 8, the remote control device 7 comprises a user interface in the form of a touch screen display 60. The remote control device 7 is operated by a suitably configured computer program.

A method of joining a lighting device 3' to the network 2 and pairing the lighting device 3' with the remote control device 7, such that it is controllable on the network by the remote control device 7 is described below.

A user 100 presses the button 14, on the remote selection device 4, which causes the remote selection device 4 to generate a first joining code, in the form a random 8-digit alpha-numeric code and to display the first joining code on the LCD 16.

Figure 4:
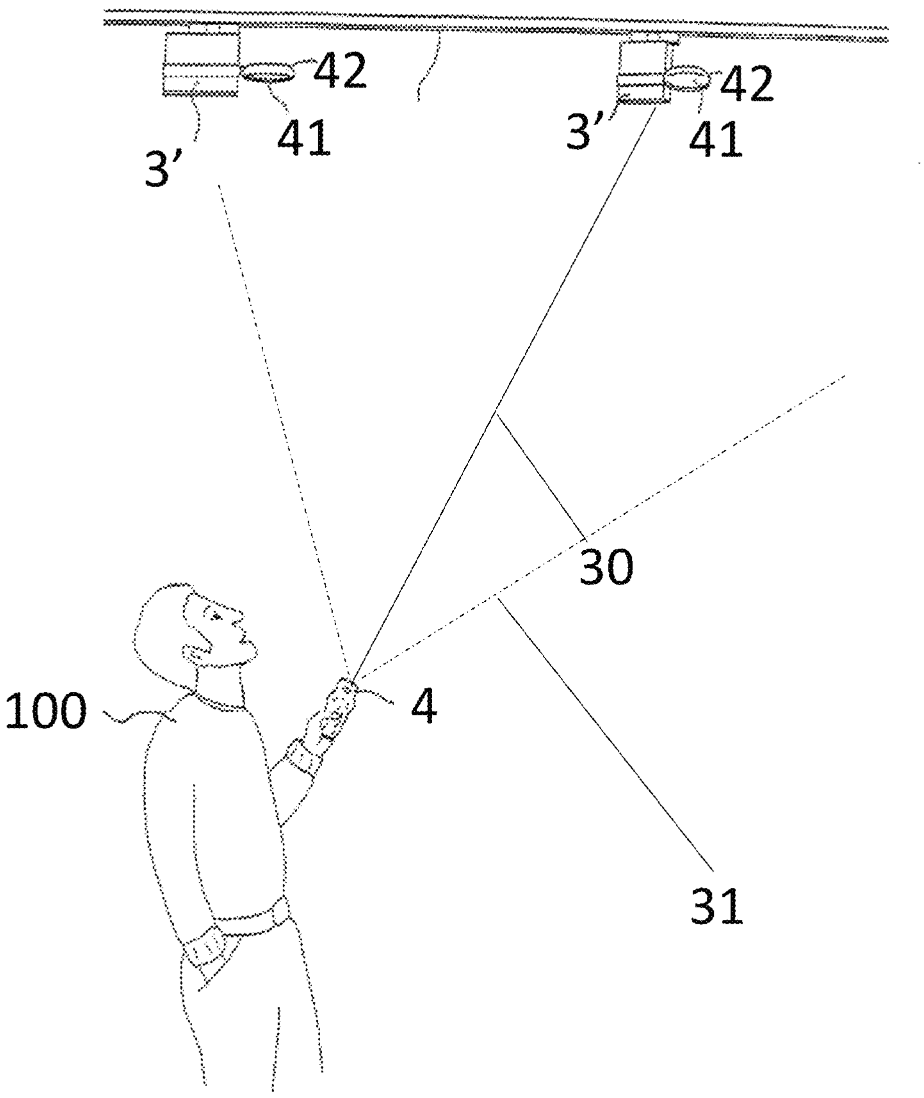
FIG. 4 is a side view showing a user operating the remote selection device to select a lighting device of the lighting system of the first embodiment.
Figure 9:
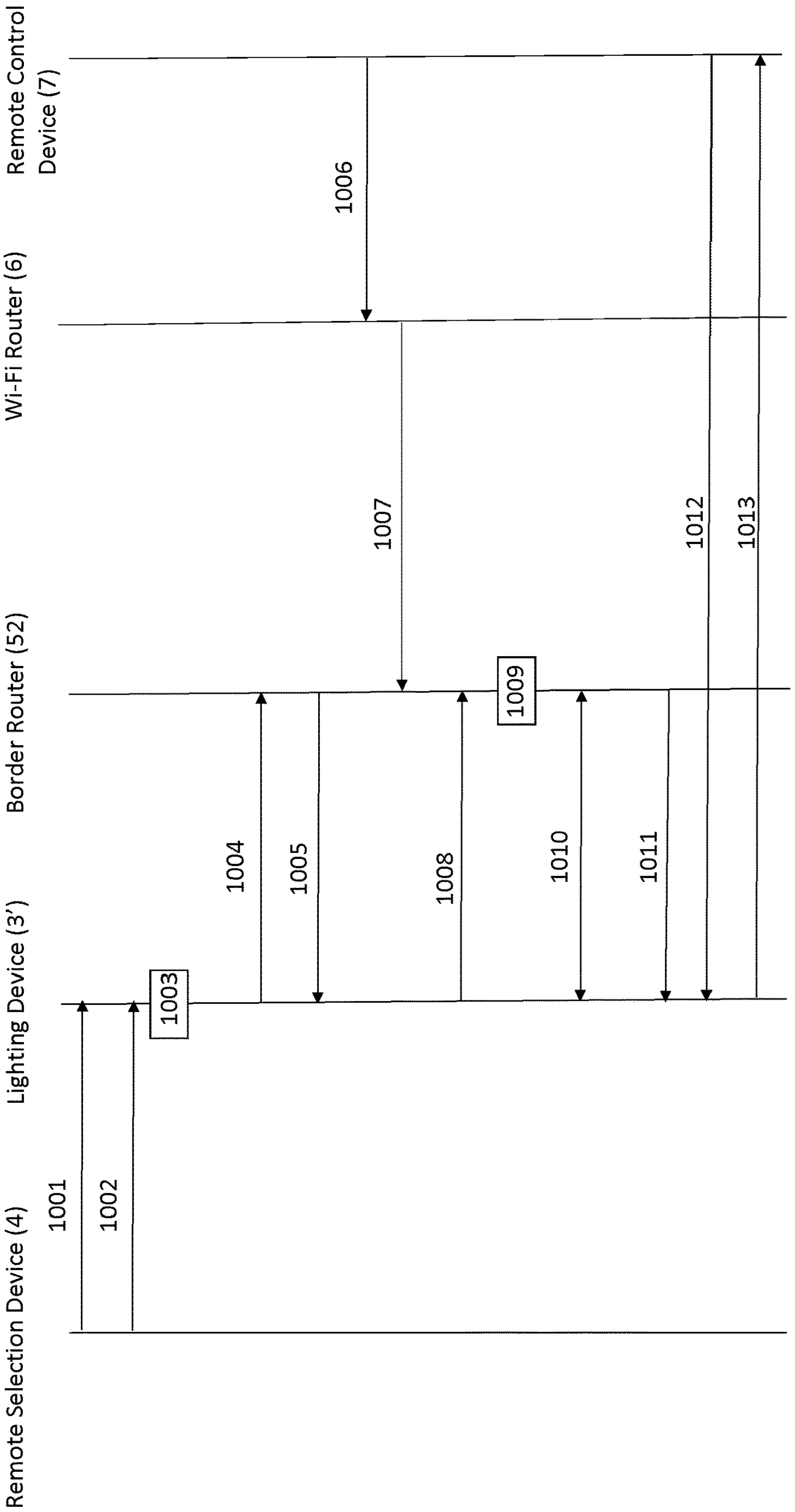
FIG. 9 shows a data flow diagram (also known as a 'ladder diagram') of a method of joining a lighting device to a network, and pairing the lighting device with a remote control device, in the lighting system of the first embodiment of the invention.

The initiation of the generation of the first joining code also triggers a continuous transmission of the infrared (IR) beam 31, containing the first joining code, by the infrared beam emitter 8 (step 1001—See FIG. 9). This continues until a certain time has elapsed (e.g. 60 seconds) or if the user 100 presses the button 14 again, whichever occurs first. Due to the relatively wide width of the IR beam 31, it is transmitted to the plurality of lighting devices 3' (i.e. of the lighting devices 3' that are not yet part of the network 2). In the currently described embodiment the infrared beam is wide enough that it is transmitted to three of the lighting devices 3' (two of which are shown in FIG. 4). However, it may be wide enough that it is transmitted to a different number of the devices 3'.

The infrared receiver 21, of each of these lighting devices 3', receives the infrared beam 31 and the microcontroller 22 of the lighting device 3' then reads the first joining code contained in the infrared beam 31. The first joining code is then stored in a memory of the microcontroller 22. The indicator LED array 85, of each of these devices 3', then flashes white, to indicate that the lighting device 3 has received the first joining code.

Whilst the infrared beam 31 is being transmitted to the lighting devices 3', the user 100 turns the laser beam 30 (of the remote selection device 4) on (by pressing the button 15) and directs the laser beam 30 onto the laser beam sensor 20 of one of the lighting devices 3' (that are receiving the IR beam 31) that is selected to be joined to the network 2 and paired (step 1002). The receipt of both the laser beam 30 and the joining code in the infrared beam 31 enters the lighting device 3', into a joining mode (step 1003). At this stage, the LED array 85 changes to red.

In this respect, if the lighting device 3' has not received the laser beam 30 or a joining code from the IR beam 31 then it is in a non-joining mode (unless it is in a networked mode—see below). In the non-joining mode, the lighting device 3' does not attempt to join the network 2.

Accordingly, the lighting devices 3' that were not selected by the laser beam 30 are in the non-joining mode, even though they received the infrared beam 31 containing the first joining code.

It will be appreciated that, although the steps 1001, 1002 are shown separately in FIG. 9, they are actually occurring at the same time.

In the currently described embodiment the receipt of the laser beam 30, by the selected lighting device 3', whilst the selected device 3' is receiving the infrared beam 30 containing the first joining code, enters the selected lighting device 3' into the joining mode 1003.

Alternatively, the lighting device 3' may be entered into the joining mode 1003 by receiving the laser beam 30 and the infrared beam 31 at different times (although it is necessary to have received both the laser beam 30 and the laser beam 31 in order for the lighting device 3' to enter the joining mode). For example, the lighting device 3' may be put into the joining mode if it receives the infrared beam 31 before or after the laser beam 30. However, optionally in that case, the lighting device may only entered into the joining mode if the infrared beam 31 and laser beam 30 are received within a certain period of time of each other, or before some cancellation event occurs, such as a different lighting device being added to the network 2.

In the joining mode the selected lighting device 3' scans for a network that it can join (step 1004) and, once it detects a network 2, it attempts to join the network 2 using the first joining code that it has received, from the infrared beam 31 (which is stored in its processor's memory), described further below.

In this respect when the selected lighting device 3' is in the joining mode, the processor sends a 'joining mode' signal to the transmitter 25 (of the network adaptor 23) which, in response, broadcasts a radio signal to scan for a network that the selected lighting device 3' can join (step 1004).

This signal is received by the border router 52 of the network 2 which, in response, transmits a signal identifying the network 2 back to the receiver 24 of the network adaptor 23 of the selected lighting device 3' (step 1005), which is then transmitted to the processor 22.

The processor 22 then sends a signal to the transmitter 25, of the network adaptor 23, which transmits a signal back to the border router 52, that attempts to join the lighting device 3' to the network 2 using the first joining code (that it has received from the infrared beam 31). During this process, the LED array 85 flashes blue/red to indicate that the lighting device 3' is attempting to join the network 2. However at this stage the border router 52 is in a non-joining mode, so the lighting device 3' is not yet added to the network 2 and, accordingly, continues to attempt to join the network 2.

In this respect, the border router 52 is configured to have a joining mode and a non-joining mode. In the joining mode, the border router 52 allows the selected lighting device 3' (which is in its joining mode) to be joined to the network 2 if the joining code received by the selected device 3' is an access code for the network 2. In the non-joining mode, the border router 52 does not allow the selected device 3' to be joined to the network 2, even if the lighting device 3' is in its joining mode and the joining code received by the selected device 3' is an access code for the network.

The user 100 then selects a dialogue box on the touch screen display 60, of the remote control device 7, that displays the text 'Add light'. The touch screen display 60 then displays a request for a joining code to be used for the lighting device 3' to be joined to the network 2 and paired with the remote control device 7. The user 100 then reads the first joining code, from the LCD display 16 on the remote selection device 4, and enters the first joining code on the touch screen display 60 of the remote control device 7, as requested.

In the currently described embodiment the first joining code is input to the remote control device 7 after the lighting device 3' receives the laser beam 30 and joining code in the IR signal 31. Alternatively, this may be done before the lighting device 3' receives the laser beam 30 and joining code in the IR signal 31, or between the receipt of the laser beam 30 and joining code in the IR signal 31.

The joining code input to the remote control device 7 will be referred to as a 'second' joining code. However it will be appreciated that, in the currently described embodiment, the first and second joining codes are the same code.

The second joining code provides a basis for one or more access codes for the network 2. In this respect, the network 2 is a secure network and the border router 52 requires that an access code is required for a lighting device 3' (or any device) to join the network 2. In the currently described embodiment the border router 52 sets the access code to be the second joining code, or an associated joining code. The access code may be 'associated' with the second joining code if it is derivable from it. For example, it may be an encrypted version of the second joining code that can be decrypted to the second joining code (or vice versa). Alternatively there may only be one access code, which may be the second joining code.

The remote control device 7 then transmits the second joining code to the border router 52, via the Wi-Fi router 6 (steps 1006 and 1007), which causes the border router 52 to enter its joining mode.

At this stage, the selected lighting device 3' is still in its joining mode (1003) and so is still attempting to join the network 2, using the first joining code that it has received (step 1008).

The border router 52 compares the first joining code (received by the selected lighting device 3') with a permissible access code for the network 2 i.e. a code that is the same as, or associated with, the second joining code (step 1009).

If the first joining code (received by the selected lighting device 3') is a permissible access code for the network 2 then secure key exchange occurs between the border router 52 and the selected lighting device 3' (step 1010) and the lighting device 3' is joined to the network 2. If the first joining code is not a permissible access code for the network 2 then the secure key exchange does not occur and the selected lighting device 3' is not joined to the network 2.

A network address, in the form of an IPv6 address, is then assigned to the joined lighting device 3', by the border router 52 (step 1011). In response, the indicator LED array 85 of the joined lighting device 3' changes to green.

The remote control device 7 transmits an interrogation signal across the network 2 (via the network controller 5) to identify any new lighting devices 3 that have been joined to the network 2 (step 1012). In response, the joined lighting device 3' replies, to the remote control device 7, with its IPv6 address (step 1013).

The remote control device 7 records the IPv6 address and pairs it with a specific icon 61 on its display. The indicator LED array 85, of the lighting device 3' then changes to flashing white and green, to indicate that the lighting device 3' has been successfully paired with the remote control device 7.

The lighting device 3' is entered into a networked mode when it is joined to the network 2. When the lighting device 3' is in the networked mode, it may not be entered into the joining mode, i.e. it may not be entered into the joining mode in response to receipt of the laser beam 30 and of the joining code from the IR beam 31. This prevents a lighting device 3' that is joined to the network 2 from trying to re-join the network 2 if it subsequently receives the laser beam 30 and the joining code from the IR beam 31, for example by accident when a user is trying so select another lighting device 3' to be joined to the network 2.

The lighting device 3' is in a non-networked mode when it is not part of the network 2. In this respect, the lighting device 3' is configured such that when it is disconnected from the network 2, its mode is changed from the networked mode to the non-networked mode. In the non-networked mode, the lighting device 3 may be in the non-joining mode or the joining mode. In this respect in the non-networked mode, the lighting device is in the non-joining mode unless it has been entered into the joining mode (in response to receipt of the laser beam 30 and the IR beam 31).

The border router 52 is entered back into its non-joining mode in response to the joining of the lighting device 3' to the network 2.

The remote control device 7 then retrieves characteristics from the lighting device 3', namely pan range, tilt range and lighting options.

The remote control device 7 pairs the network address with the display icon 61 such that a selection of the display icon 61 selects that lighting device 3' for receipt of control commands from the remote control device 7 (via the network controller 5).

In this respect, in order to control a paired lighting device 3 on the network 2, the user 100 selects the display icon 61 that has been paired with that lighting device 3. The touch screen 60 then displays control buttons for controlling the pan, tilt and brightness of that lighting device 3. It will be appreciated that that invention is not limited to controlling the pan, tilt and brightness and that any controllable characteristic of the lighting device may be controlled. The user 100 then inputs command controls, via these displayed buttons, to control the lighting device 3'.

The control commands are then transmitted from the remote control device 7 to the border router 52, via the WiFi router 6, and from the border router 52 across the network 2 to the joined lighting device 3 by RF signals between the lighting devices 3.

The lighting device 3 receives the control commands, via the receiver 24 of its network adaptor 23, and these are transmitted to its processor 22. The processor 22 then controls the pan and tilt motors 29, 33 and the brightness of the lamp 41 in dependence on the control commands (and the current sensed tilt angle, pan angle and brightness of the lighting device 3).

In this way, a specific display icon 61 is paired with that specific lighting device 3'. The above joining/pairing steps are repeated to individually select and join each lighting device 3' to the network 2 and to pair each lighting device 3' with a respective display icon 61 so that each lighting device 3' is individually selectable and controllable by the remote control device 7.

To aid in visualisation to the user, when designing a lighting arrangement, the display icons 61 are moved (for example by dragging), on the touch screen 60, so that their positions correspond to the physical layout of the lighting devices 3 in the network 2. In order to do this, the user 100 selects and holds their finger down on a display icon 61 to be moved. This activates a 'repositioning mode' for that display icon 61 and the user 100 then drags the icon 61 to the desired location.

The display icons 61 are groupable into groups. In FIG. 8, the display icons 61 are divided into two groups 62, 63, comprising three and two display icons 61 respectively (for clarity only five of display icons are shown, but it will be appreciated that there is a display icon 61 for each lighting device 3 in the network 2). However, it will be appreciated that any suitable number and size of groups may be used. A selection of a group 62, 63 selects all of the lighting devices 3 in that group, such that the same control commands are sent to each lighting device 3 in that group. This allows a group of multiple lighting devices 3 to be controlled at the same time.

The above joining and pairing method is advantageous in that it allows the directional laser beam 30 to be used to accurately select a single lighting device 3' to be paired. However operator accuracy is not necessary to transmit the first joining code, via the infrared beam 31, to the lighting devices 3' (which include the selected device 3'), as this is a relatively wide beam.

The remote selection device 4 is configured to provide the option of transmitting the same first joining code each time (i.e. each time a lighting device 3' is joined to the network 2) and the remote control device 7 is configured to automatically provide a user with the option of using the same second joining code each time (which is the same as the first joining code). This is advantageous in that it allows subsequent lighting devices 3' to be joined to the network 2, and paired, relatively quickly and easily.

The network controller 5 also comprises an interface known as a Digital Addressable Lighting Interface (DALI) 82 which connects an input of the processor 51 to a second remote control device 83 via an RF signal. Any suitable interface may be used, including a DMX interface (e.g. a DMX512 interface).

Control commands input to the second remote control device 83 are also transmitted, via the network controller 5, to the lighting devices 3 on the network 2. In this respect, control commands input to the second remote control device 83 are transmitted to every lighting device 3 such that every lighting device 3 on the network 2 is controlled in the same way, by the control commands.

The control commands from the second remote control device 82 override the control commands from the (first) remote control device 7. In this respect, a user 100 may control each lighting device 3 individually (e.g. the tilt angle, pan angle, brightness etc.), using the first remote control device 7. However the second remote control device 82 can be used to control all the lighting devices 3, on the network 2, together in the same way. For example all the lighting units 3 may be moved a certain tilt or pan angle, or have their brightness changed, by a set amount relative to their current tilt angle, pan angle, brightness, etc.

The first remote control device 7 may be used, for example, by a lighting designer, to produce a desired overall lighting mode. The second remote control device 83 may be used, for example, by a member of staff during an event, to adjust the lighting units together, for example to adjust the brightness of all the lighting units together, for example to set them to previously recorded configurations or scenes. In this respect, the second remote control device may be configured to store a particular configuration, of all of the lighting devices 3 on the network 2, and to recall and command the lighting devices 3 to adopt this configuration.

Figure 10:
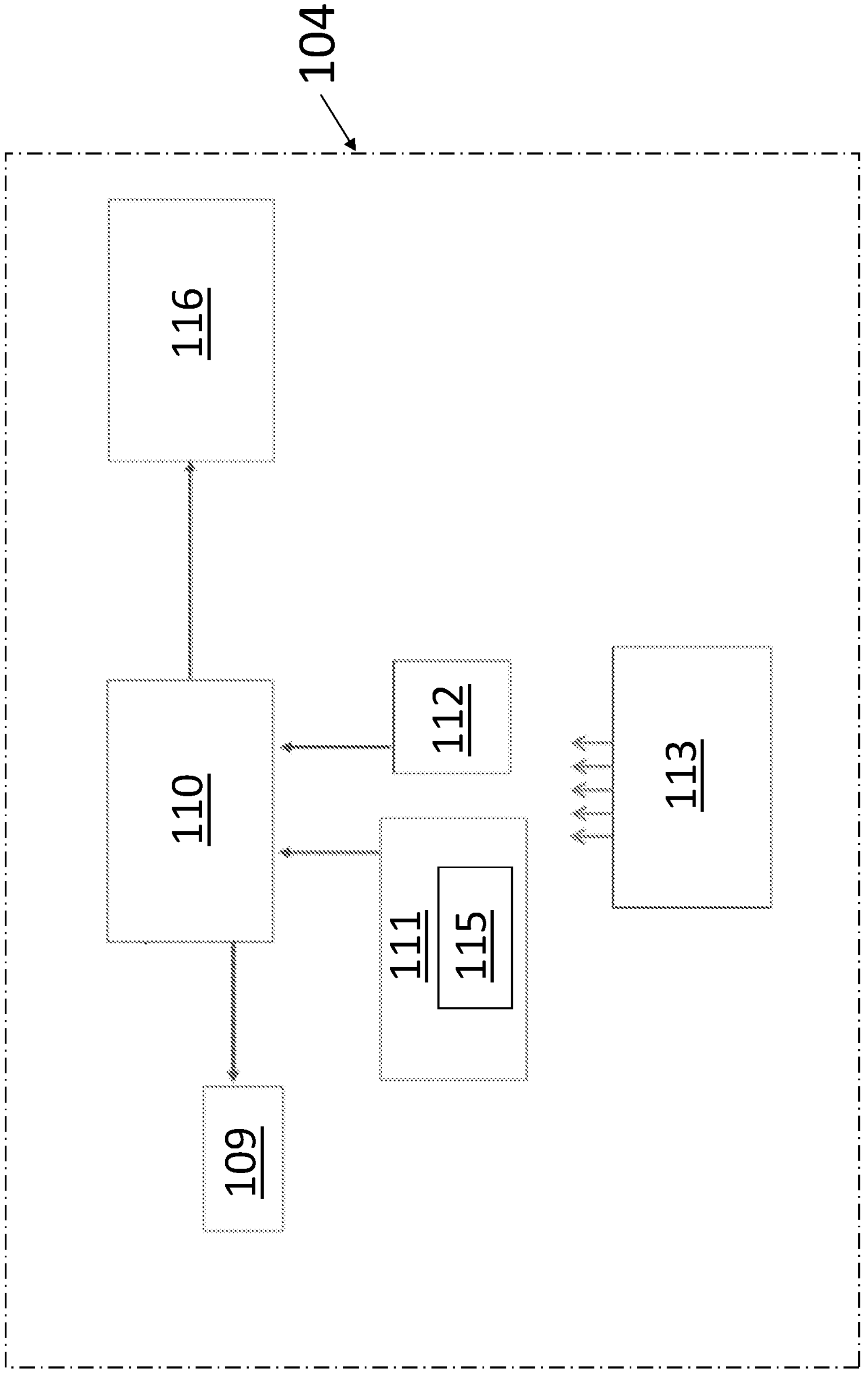
FIG. 10 shows a view corresponding to that of FIG. 3, but where the remote selection device is of a lighting system according to a second embodiment of the invention.
Figure 11:
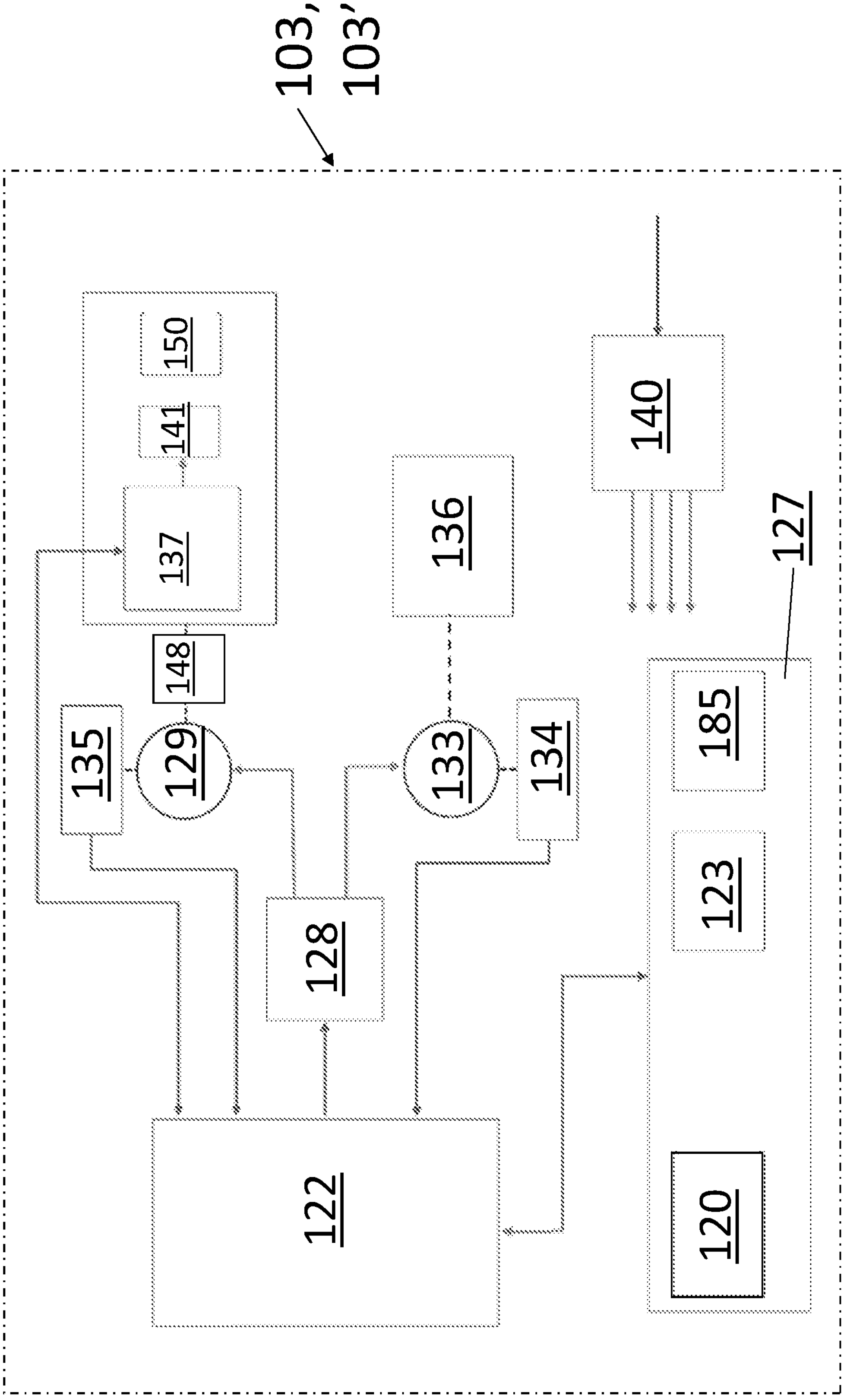
FIG. 11 shows a view corresponding to that of FIG. 5, but where the lighting device is of the lighting system according to the second embodiment of the invention.
Figure 12:
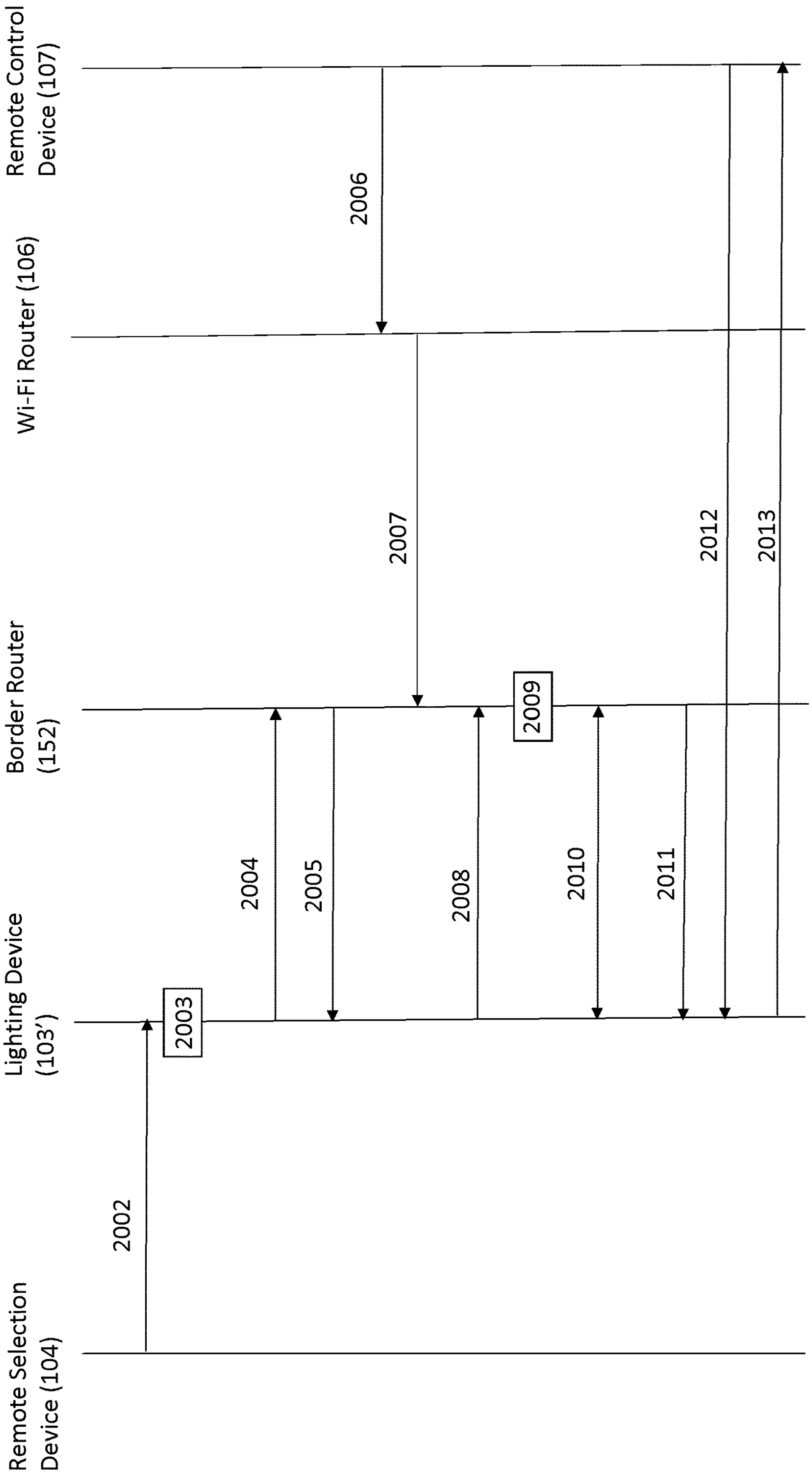
FIG. 12 shows a data flow diagram (also known as a 'ladder diagram') of a method of joining a lighting device to a network, and pairing the lighting device with a remote control device, in the lighting system of the second embodiment of the invention.

Referring to FIGS. 10 and 11, there is shown a remote selection device 104 and each lighting device 103, 103' of a lighting system of a second embodiment of the invention. FIG. 12 shows a data flow diagram, that corresponds to FIG. 9, but that is for the lighting system of the second embodiment of the invention.

The lighting system according to the second embodiment of the invention is the same as the lighting system 1 as the first embodiment of the invention, except for the differences described below. Corresponding features are given corresponding reference numerals, but incremented by 100. In FIG. 12, steps that have corresponding steps to the first embodiment (in FIG. 9) have corresponding reference numerals, but incremented by 1000.

In the second embodiment, the infrared beam emitter 8 is omitted from the remote selection device 104 and the infrared beam receiver 21 is omitted from each lighting device 103, 103'.

The first joining code is transmitted by the laser beam 30 (step 2002), instead of being transmitted by an infrared beam. In this respect, the laser beam 30 is modulated to contain the first joining code and the processor 122 of each lighting device 103, 103' is configured to read the first joining code from the laser beam 30 received by the laser beam sensor 120. Accordingly, in this embodiment, the laser beam 30 acts to both select a lighting device 3' and to transmit the first joining code to the lighting device 3'. The subsequent steps, in the joining and pairing of the lighting device 103', correspond to those of the first embodiment.

Figure 13:
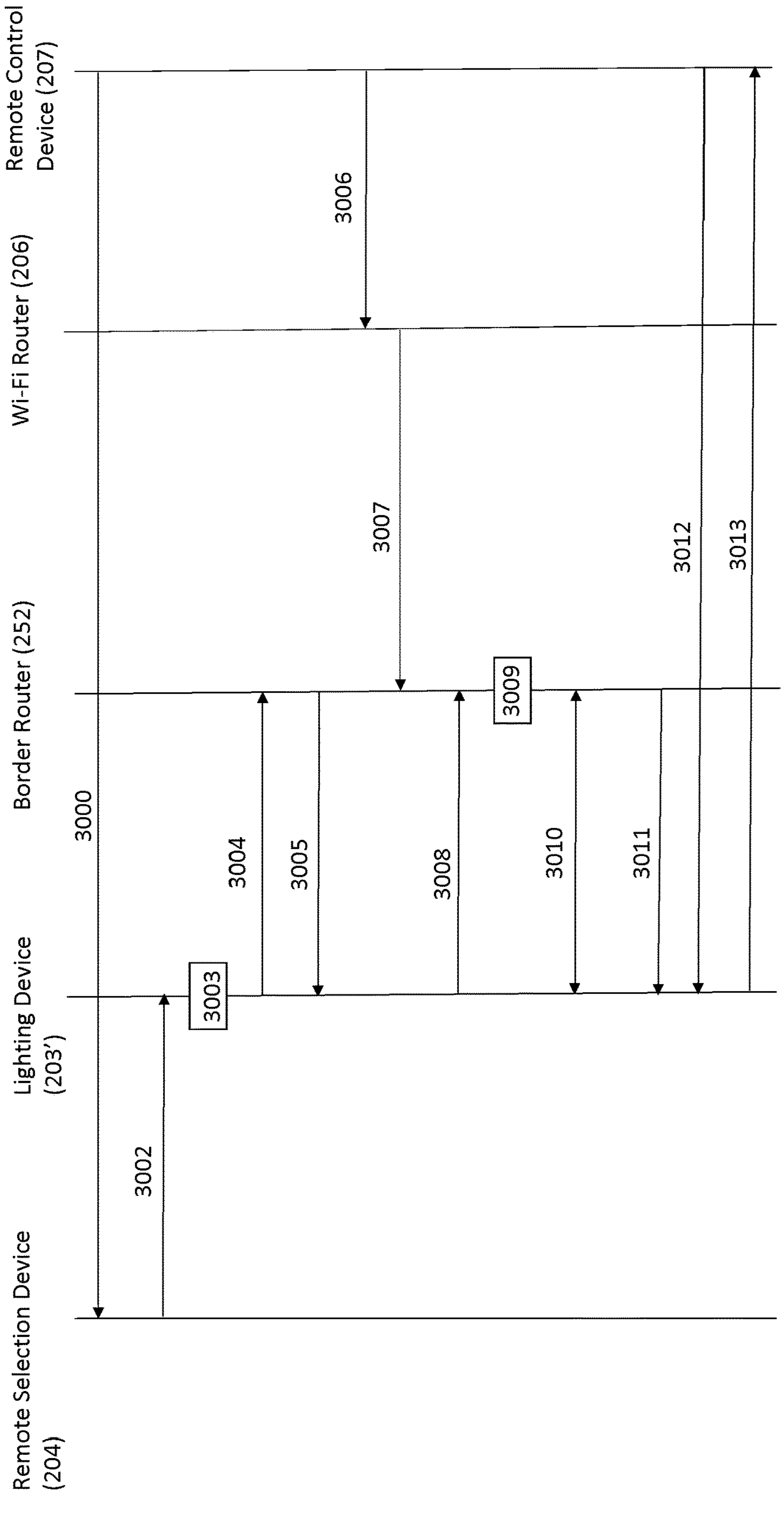
FIG. 13 shows a data flow diagram (also known as a 'ladder diagram') of a method of joining a lighting device to a network, and pairing the lighting device with a remote control device, in the lighting system of a third embodiment of the invention.

A lighting system according to a third embodiment of the invention is the same as the lighting system as the second embodiment of the invention, except for the differences described below. FIG. 13 shows a data flow diagram, that corresponds to FIG. 12, but is for the third embodiment of the invention. In FIG. 13, steps that have corresponding steps to the second embodiment have corresponding reference numerals, but incremented by 1000.

Figure 14:
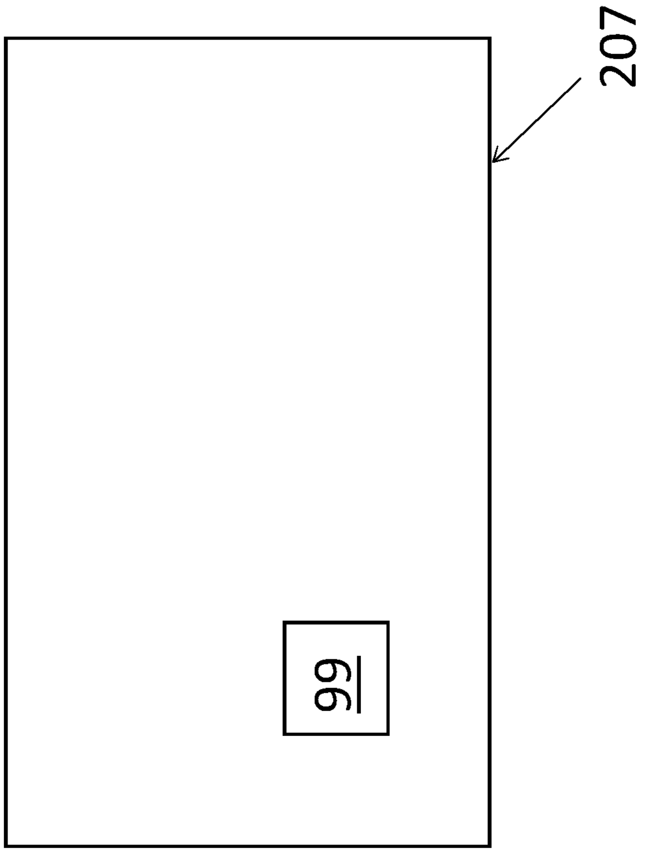
FIG. 14 shows a schematic view of a remote control device of the lighting system of the third embodiment of the invention (showing only a joining code generator, and with other features of the remote control device omitted for clarity)

In the third embodiment the first joining code is transmitted by the laser beam 30 emitted from the remote selection device 204 (step 3002) (as with the second embodiment). However, in the third embodiment, the second joining code is not input into the remote control device 207. Instead, the remote control device 207 comprises a joining code generator 99 (see FIG. 14, which shows a schematic view of a remote control device 207 of the lighting system of the third embodiment of the invention, but showing only the joining code generator 99, and with other features of the remote control device omitted for clarity). The joining code generator 99 may be configured to generate a random 8-digit alpha-numeric joining code. Alternatively, the second joining code generator 99 may be configured to generate the same second joining code each time a lighting device 3' is joined to the network 2 and paired with the remote control device 207.

Figure 15:
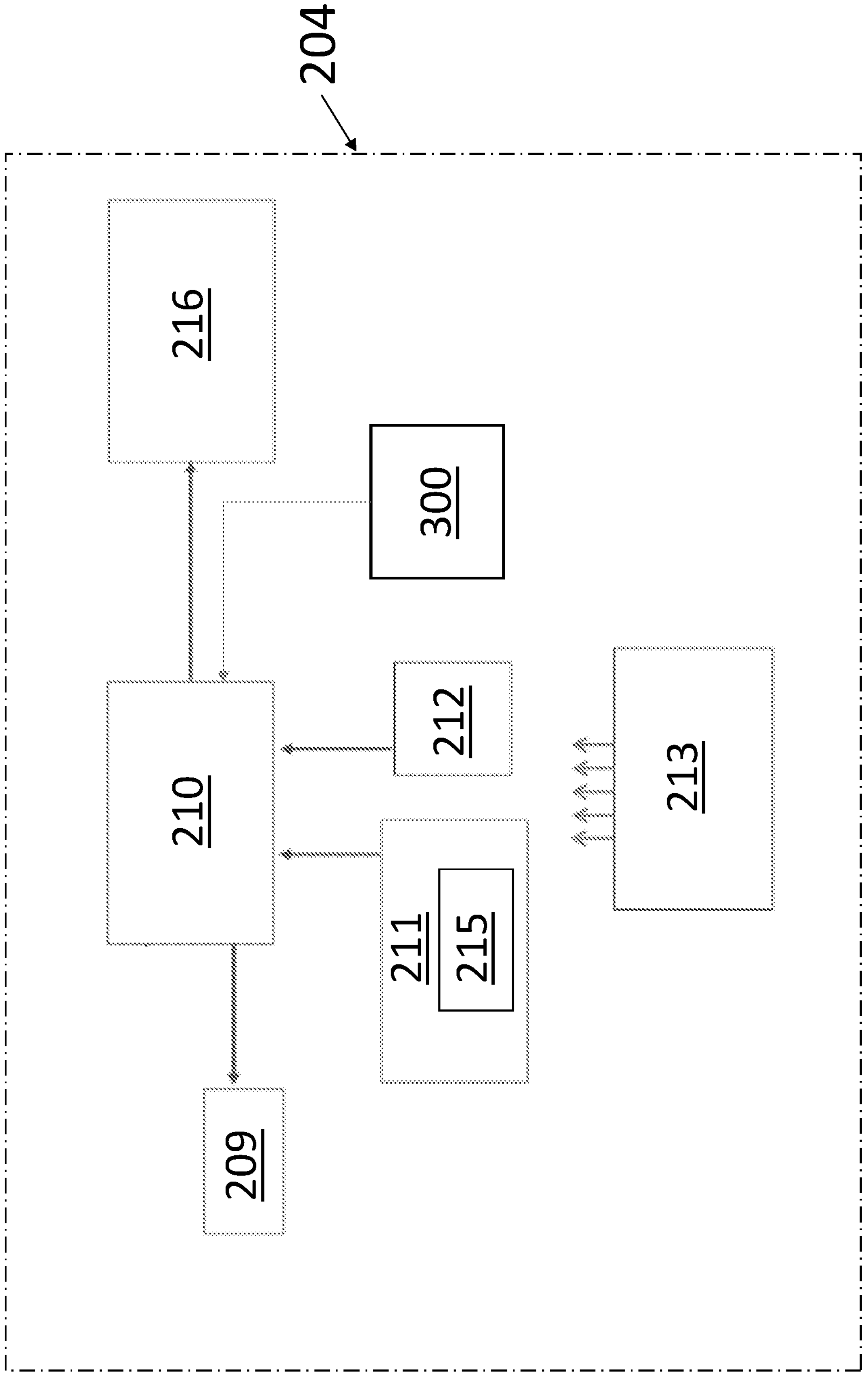
FIG. 15 shows a view corresponding to that of FIG. 3, but where the remote selection device is of a lighting system according to the third embodiment of the invention.

The remote control device 207 then transmits the joining code to the remote selection device 204 (step 3000). In this respect, the remote control device 207 transmits the joining code in a Wi-Fi signal to the remote selection device 204. The remote selection device 204 comprises a receiver 300 (see FIG. 15) configured to receive the Wi-Fi signal, containing the joining code, from the remote control device 207. In the currently described embodiment this communication is by a Wi-Fi signal. However, it will be appreciated that any type of signal could be used, including any type of electromagnetic radiation signal, or even a via a wired connection.

The receiver 300 transmits the received signal to the processor 210, which reads the joining code. The processor 210 then encodes this joining code in the laser beam 30 (emitted by the laser beam emitter 209). The laser beam 30 is used to select a lighting device 203' to be joined to the network and paired, and to transmit the joining code to the selected lighting device 203', as in the second embodiment. In this respect, the joining code generated by the remote control device 207 forms the 'first joining code' of the preceding embodiments.

In addition, the remote control device 207 transmits the generated joining code to the border router 252, via the Wi-Fi router 206 (steps 3006 and 3007). In this respect, the joining code generated by the remote control device 207 also forms the 'second joining code' of the preceding embodiments).

The remaining steps of the method of joining the lighting device 203' to the network, and pairing it, are the same as in the second embodiment, shown by the corresponding reference numerals (incremented by 1000).

The lighting system, of each of the described embodiments, may allow for lighting devices 3' to be joined to a network 2 and paired with the remote control device 7 such that the lighting device 3' is controllable on the network 2 by the remote control device, in a relatively quick and simple way that reduces the risk of incorrect installation and may avoid difficult and dangerous work at height.

It may also allow for lighting devices 3' that are inaccessible (e.g. due to being located high up, out of reach) to be joined quickly, safely and easily, to a network and paired with the remote control device 7, where this would otherwise be difficult, dangerous or impossible. In this respect, the user 100 may select each lighting device 3', and join it to the network 2 and pair it, whilst remaining on the floor level of the room in which the lighting devices 3' are mounted (e.g. in the ceiling). Therefore this may avoid dangerous work at height.

Furthermore because the joining code is transmitted to the selected lighting device 3', it may not be necessary for each lighting device 3' to be associated with a unique passphrase and for the passphrase for all of the lighting devices 3' to be known and recorded for each lighting device 3' prior to the joining of the lighting devices 3' to the network 2 and the pairing of the lighting devices 3' with the remote control device 7.

Also the selection of an individual lighting device 3' (using the directional laser beam 30) and the transmittal of the joining code to the selected lighting device 3' may provide a relatively fast and efficient method of joining lighting devices 3' on a network 2 and pairing the lighting device 3' with the remote control device 7.

In addition, because the lighting devices 3 are in a wireless network 2, this may reduce the likelihood of errors during installation, for example as compared to if the lighting devices 3 were on a wired network.

Furthermore, because the remote selection device 4 is configured to transmit the same first joining code each time and the remote control device 7 is configured to automatically provide a user with the option of using the same second joining code each time (in the first and second embodiments), this may allow subsequent lighting devices 3' to be added quickly and easily.

It will be appreciated that numerous modifications to the above described design may be made without departing from the scope of the invention as defined in the appended claims.

For example, in the currently described embodiments the access code for the network is set by the input or generation of the second joining code. Alternatively the access code may be fixed, for example by the network controller (and not set by the input or generation of a second joining code). In this case, the border router may always be in its joining mode.

In the described first embodiment the infrared beam 31, containing the first joining code, is broadcast to a plurality of lighting devices 3' (that are not yet joined to the network). Alternatively, it may only be broadcast to one of the lighting devices 3' (that are not yet joined to the network).

In the first and second embodiments the second joining code is input to the remote control device 7. Alternatively it may be input into the remote selection device, or a separate input device, which then transmit it to the border router.

In the described embodiment the laser beam 30 is a laser beam of visible light. However, it may be a directional beam of electromagnetic radiation of any suitable type. Where it is a laser beam, the laser beam may be of electromagnetic radiation of any frequency, including an infrared laser or ultraviolet laser, for example. However, a laser beam of visible light is particularly advantageous as it allows a user to visually direct the laser beam to the selected lighting device 3.

A beam of visible light from a light emitting diode (LED) may be used in place of the laser beam 30.

In the described first embodiment the remote selection device 4 transmits the first joining code via an infrared beam. Other types of electromagnetic radiation may be used, including, but not limited to, radio frequency waves.

In the described embodiments the remote control device 7, remote selection device 4 and network controller 5 are separate devices. Alternatively the remote control device 7, the remote selection device 4 and/or the network controller 5 may be the same device.

In the described embodiments the network 2 is a wireless mesh network of the type known as a 'Thread' network, provided by Silicon Labs However, it will be appreciated that any suitable type of network may be used, including a wireless mesh network known as a 'ZigBee' wireless mesh network, for example. Other types of wireless network, that are not mesh networks, may also be used.

Furthermore, the network could even be a wired network, for example using DMX connections. However, the invention is particularly advantageous when used with a wireless network.

Although it is preferred that the same joining code is used to pair each lighting device, different joining codes could be used each time.

In the currently described embodiment the remote selection device 4 is handheld. As a further option it may be portable (e.g. on wheels) but not handheld.

In the described embodiments the first joining code is transmitted to the one or more lighting devices 3' before the second joining code is received by the network controller (i.e. the border router 52). Alternatively the second joining code may be received by the network controller (e.g. the second joining code may be input or generated) before the first joining code is transmitted to the one or more lighting devices 3'. As a further alternative, the second joining code may be received by the network controller (e.g. the second joining code may be input or generated) at the same time the first joining code is transmitted to the one or more lighting devices 3'.

Prior to the joining of a lighting device to the network, communication between the joining lighting device 3' and the lighting devices 3 already joined to the network 2 may be possible, but constrained. In this respect prior to the lighting device 3' joining the network 2, communication between the lighting device 3' and other lighting devices 3 already joined to the network 2 may be performed only with a reduced message set (i.e. a finite but reduced message set). The reduced message set may be a message set that operates during the joining process, without jeopardising the security of the network 2.

Joining the lighting device 3' to the network 2 may therefore comprise configuring one or both of the lighting device 3' and the network 2 (e.g. the network controller 5, for example the border router 52) to enable communication between the lighting device 3' and other devices connected to the network (e.g. other lighting devices 3 already connected to the network 2) by use of an expanded message set, for example including message types not supported prior to the joining (in the reduced message set). It will be appreciated that the terms ‘reduced’ and ‘expanded’ are relative to each other, i.e. the expanded message set includes additional message types to the reduced message set. The expanded message set may be referred to as a full message set, as known to those skilled in the art. It will be appreciated that a message set defines the range of message types provided for by the communication protocol.

Thus the method of joining a lighting device to a network may comprise configuring one or both of the lighting device 3' (to be joined to the network 2) and the network 2 (for example the network controller 5, for example the border router 52) such that the lighting device 3' can communicate with other devices on the network 2 using an expanded message set.

Alternatively, prior to the joining of a lighting device 3' to the network, communication between the joining lighting device 3' and the lighting devices 3 already joined to the network 2 may not be possible. In this case, joining the lighting device 3' to the network 2 may comprise configuring one or both of the lighting device 3' (to be joined to the network 2) and the network (e.g. the network controller 5, for example the border router 52) to enable communication between the lighting device 3' and the other lighting devices 3 connected to the network 2.

Prior to the joining of a lighting device 3' to the network 2, the lighting device 3' may only be able to communicate with an access point for the network (for example the border router 52). This may be by direct communication with the access point. Alternatively this may be by indirect communication, across the network 2, via one or more other devices (e.g. lighting devices 3) already connected to the network 2.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of joining a lighting device to a network and pairing the lighting device with a remote control device, the method comprising:

a) transmitting a first joining code to one or more lighting devices using an electromagnetic radiation signal;

b) selecting a lighting device to be joined to a network and paired with a remote control device by directing a directional beam of electromagnetic radiation onto a sensor of a lighting device;

c) at a network controller on the network, receiving a second joining code and setting an access code for the network to be the second joining code or an associated joining code;

d) in response to receipt of the directional beam of electromagnetic radiation and of the first joining code from the electromagnetic radiation signal, by the selected device, joining the selected device to the network if the received first joining code is the access code for the network; and e) pairing the joined selected lighting device with the remote control device such that the joined lighting device is controllable, on the network, by the remote control device.

2. The method according to claim 1, wherein the directional beam of electromagnetic radiation is a different beam to the electromagnetic radiation signal that contains the joining code.

3. The method according to claim 1, wherein the joining code is generated by a joining code generator device.

4. The method according to claim 1, wherein the second joining code is input by a user to the remote control device.

5. The method according to claim 4, wherein the first joining code is displayed to a user and the user reads the first joining code and inputs it, to the remote control device, as the second joining code.

6. The method according to claim 1, wherein the second joining code is transmitted, as the first joining code, to the one or more lighting devices using the electromagnetic radiation signal.

7. The method according to claim 1, wherein step (d) comprises assigning a network address to the joined device.

8. The method according to claim 1, wherein the directional beam of electromagnetic radiation and/or the electromagnetic radiation signal containing the joining code is emitted by a portable user-operated remote selection device.

9. The method according to claim 1, wherein steps (a) to (d) are repeated to join a plurality of lighting devices to a network and to pair the lighting devices with the remote control device such that each lighting device is controllable, on the network, by the remote control device.

10. The method according to claim 9, wherein the joining code that is transmitted in the electromagnetic radiation signal is the same each time a lighting device is to be joined to the network and paired with the remote control device.

11. The method according to claim 1, wherein the pairing comprises pairing a graphical representation on a display of the remote control device with the joined lighting device such that selecting the graphical representation selects the lighting device for receipt of control commands from the remote control device.

12. The method according to claim 11, wherein the graphical representations are groupable into groups such that a selection of a group selects all the lighting devices, that are paired with the graphical representations in that group, to receive the same control commands from the remote control device.

13. The method according to claim 1, wherein each lighting device provides a visual indication when:

it has received the electromagnetic radiation signal containing the joining code;

its sensor has received the directional beam of electromagnetic radiation;

it is attempting to join to the network; and/or it has been paired with the remote control device.

14. A method of controlling a lighting device in a network, the method comprising:

(a) joining the lighting device to a network and pairing the lighting device with a remote control device according to the method of claim 1; and (b) controlling the lighting device with the remote control device.

15. The method according to claim 14, wherein the, or each, paired lighting device on the network is also controllable by a second remote control device.

16. A lighting system, for lighting a space, the lighting system comprising a remote control device and a network of lighting devices, wherein at least one of the lighting devices has been joined to the network and paired with the remote control device by the method according to claim 1.

17. A lighting system, for lighting a space, wherein the lighting system comprises:

a network;

a network controller on the network;

a remote control device which can be connected to the network;

a joining code emitter, configured to transmit a first joining code to one or more lighting devices using an electromagnetic radiation signal;

a directional beam emitter, configured to select a lighting device to be joined to the network and paired with the remote control device by directing a directional beam of electromagnetic radiation onto a sensor of a lighting device; and a lighting device, configured to receive the directional beam of electromagnetic radiation and the first joining code from the electromagnetic radiation signal;

wherein the network controller is configured to receive a second joining code and set an access code for the network to be the second joining code or an associated joining code;

wherein the network controller and lighting device are configured such that in response to receipt, by the lighting device, of the directional beam of electromagnetic radiation and of the first joining code from the electromagnetic radiation signal, the lighting device is selected and joined to the network when the received joining code is the access code for the network; and when joined to the network, the lighting device can be paired with the remote control device, so that the lighting device is controllable, on the network, by the remote control device.

18. A kit of parts comprising:

a network controller;

a joining code emitter configured to transmit a first joining code to one or more lighting devices using an electromagnetic radiation signal;

a directional beam emitter configured to select a lighting device to be joined to a network and paired with a remote control device by directing a directional beam of electromagnetic radiation onto a sensor of a lighting device; and a lighting device configured to receive the directional beam of electromagnetic radiation and the first joining code from the electromagnetic radiation signal;

wherein the network controller is configured to receive a second joining code and set an access code for the network to be the second joining code or an associated joining code;

wherein the network controller and the lighting device are configured such that in response to receipt, by the lighting device, of the directional beam of electromagnetic radiation and of the first joining code from the electromagnetic radiation signal, the lighting device is selected and joined to the network when the received joining code is the access code for the network; and when joined to the network, the lighting device can be paired with a remote control device so that the lighting device is controllable, on the network, by the remote control device.

19. The method according to claim 18, wherein the kit of parts comprises a remote control device.

* * * * *